(12) United States Patent
Columbus et al.

(10) Patent No.: US 7,788,156 B2
(45) Date of Patent: Aug. 31, 2010

(54) SYSTEM, METHOD AND COMPUTER READABLE MEDIUM CONTAINING INSTRUCTIONS FOR EVALUATING AND DISSEMINATING INVESTOR PERFORMANCE INFORMATION

(75) Inventors: Craig E. Columbus, Scottsdale, AZ (US); J Carr Bettis, Scottsdale, AZ (US)

(73) Assignee: Thomson Financial LLC, New York, NY (US)

( * ) Notice: Subject to any disclaimer, the term of this patent is extended or adjusted under 35 U.S.C. 154(b) by 798 days.

(21) Appl. No.: 11/385,214

(22) Filed: Mar. 20, 2006

(65) Prior Publication Data

US 2006/0161492 A1      Jul. 20, 2006

Related U.S. Application Data

(62) Division of application No. 09/597,742, filed on Jun. 19, 2000, now Pat. No. 7,016,872.

(60) Provisional application No. 60/139,771, filed on Jun. 18, 1999.

(51) Int. Cl.
   *G06Q 40/00* (2006.01)

(52) U.S. Cl. ............................. 705/36; 705/35; 705/37; 705/38; 705/39; 705/40; 705/41; 705/42; 705/43; 705/44; 705/45

(58) Field of Classification Search ............... 705/35–45
   See application file for complete search history.

(56) References Cited

U.S. PATENT DOCUMENTS 4,566,066 A    1/1986   Towers 5,132,899 A    7/1992   Fox
5,163,131 A   11/1992   Row et al.

(Continued)

FOREIGN PATENT DOCUMENTS

WO         WO-9222036          12/1992

(Continued)

OTHER PUBLICATIONS http://ftp.sec.gov/edgar/aboutedgar.htm.*

(Continued)

*Primary Examiner*—Charles R. Kyle
*Assistant Examiner*—Robert R Niquette
(74) *Attorney, Agent, or Firm*—Stroock & Stroock & Lavan LLP

(57) ABSTRACT

An investor's performance is evaluated by utilizing information pertaining to at least one transaction made by the investor, such as an individual or entity, involving at least one investment. This evaluation includes determining a performance score indicative of the investor's performance relative to other investors. The performance score is determined at least in part by considering an average historical performance of the investment, following the transaction. In addition, the performance score is also determined by a historical consistency of the investor's performances with respect to transactions involving the investment, and the number of transactions made by the investor. Then, the performance score of the investor may be compared against the performance scores of other investors. Advantageously, this performance score may be used to produce a ranked list of investors in a particular industry, as well as with investors in different industries.

19 Claims, 21 Drawing Sheets

U.S. PATENT DOCUMENTS

| | | | |
|---|---|---|---|
| 5,521,814 | A | 5/1996 | Teran et al. |
| 5,619,709 | A | 4/1997 | Caid et al. |
| 5,761,442 | A | 6/1998 | Barr et al. |
| 5,784,696 | A | 7/1998 | Melnikoff |
| 5,790,426 | A * | 8/1998 | Robinson ............... 702/179 |
| 5,794,178 | A | 8/1998 | Caid et al. |
| 5,812,987 | A | 9/1998 | Luskin et al. |
| 5,852,811 | A | 12/1998 | Atkins |
| 5,884,274 | A | 3/1999 | Walker et al. |
| 5,884,287 | A | 3/1999 | Edesess |
| 5,911,135 | A | 6/1999 | Atkins |
| 5,930,774 | A | 7/1999 | Chennault |
| 6,035,286 | A | 3/2000 | Fried |
| 6,119,103 | A | 9/2000 | Basch et al. |
| 6,510,419 | B1 * | 1/2003 | Gatto ................. 705/36 R |
| 7,016,872 | B1 | 3/2006 | Bettis et al. |
| 7,546,263 | B2 * | 6/2009 | Columbus et al. ......... 705/36 R |
| 2002/0022988 | A1 * | 2/2002 | Columbus et al. ............. 705/11 |
| 2006/0161493 | A1 * | 7/2006 | Columbus et al. ............. 705/35 |

FOREIGN PATENT DOCUMENTS

| | | | |
|---|---|---|---|
| WO | WO-9956192 | | 11/1999 |
| WO | WO01/18671 | * | 3/2001 |

OTHER PUBLICATIONS

Felixson, Karl et al., Day End Returns—Stock Price Manipulation. J. Multifinancial Management.. pp. 95-127. 1999.*

Lawrence J. Christiano et al., "Algorithms for Solving Dynamic Models With Occasionally Binding Constraints", Federal Reserve Bank ofMinneapolis, Research Department Staff Report 171, May 1994.

Gitlin, R.D., J.F. Hayes and S.B. Weinstain. Data Communications Principles. Weinstain, Plenum Press, 1992.

Green, James Harry. The Irwin Handbook of Telecommunications. Irwin Professional Publishing, 2.sup.nd ed., 1992.

Stallings, William. Computer Organization and Architecture. MacMillan Publishing Co., 3.sup.rd ed., 1993.

Spohn, Darren L. Data Network Design. McGraw-Hill, Inc., 1993.

Boxer, A. "Where Buses Cannot Go." IEEE Spectrum, Feb. 1995, pp. 41-45.

Barroso, L.A. et al. "RPM: A Rapid Prototyping Engine for Multi-processor Sytems." IEEE Computer, Feb. 1995, pp. 26-34.

Bettis, "Volume Effects of Predisclosure Information Asymmetry: Evidence from insider-trading activities".

Bettis et al., "Insider Trading in Derivative Securities: An Empirical Examination of the Use of Zero-Cost Collars and Equity Swaps by Corporate Insiders", 1999.

Bettis et al., "Mimickers of Corporate Insiders Who Make Large-Volume Trades", Financial Analysts Journal, Sep./Oct. 1997, pp. 57-66.

Bettis et al., "New Evidence on Insider Trading Around Merger Announcements", 1997.

Bettis et al., "Effect of Legal Sanctions on Takeover Target Insider Purchases".

* cited by examiner insiderSCORES.com™
investing is not a spectator sport...™ scorelab

○ PRIMARK

| HOME | DATABASE SEARCH | QUOTES | COMMENTARY | ALERTS | HELP |

February 11, 2000

What you paid for Microsoft stock: $89 ▽ iexchange.com
What you should have paid: $10 ▽ Go Insider Filing Highlights Sponsored by i exchange.com — 601

(isc) TODAY'S TOP 5 MOST PREDICTIVE INSIDER BUYERS BASED ON PRIOR RESULTS

When insiders with a buy score of 60 or greater have bought in the past, the stocks have typically gone up within the following 6 month period. Now they are buying again.

| INSIDER | TITLE | TICKER | BUY SCORE | SHARE VOL |
|---------|-------|--------|-----------|-----------|
| GOULD | CB | BRT | 100 | 56,700 |
| ALLGOOD | D | TRMK | 91 | 10,000 |
| LEWIS | CEO | NOR | 89 | 382 |
| MARKS | B | SENEB | 87 | 12,500 |
| KIMMEL | CB | KIM | 86 | 18,363 |

} — 610

(isc) TODAY'S TOP 5 MOST PREDICTABLE INSIDER SELLERS BASED ON PRIOR RESULTS

When insiders with a SELL score of 60 or greater have SOLD in the past, the stocks have typically gone DOWN within the following 6 month period. Now they are selling again.

| INSIDER | TITLE | TICKER | sell SCORE | SHARE VOL |

---

Sponsored by Priceline.com (isc) TICKER
SYMBOL LOOKUP
QUOTES GO  DATABASE SEARCH GO Who should you follow on Wall Street? We rate all corporate insiders [BUY] [SELL] on a scale of 1-100 How? Click Here

How To Profit From ISC
Our system identifies corporate insiders whose prior trades have had a predictive correlation with future stock price moves. Click here for secrets on how you can profit using insiderSCORES.com.

Be The First To Know
Sign up for email alerts for the latest insider trading activity, news and commentary.

New On insider SCORES.com

Breaking News
First Team All Star CEO Sells at Medarex Inc.

Featured Story
Packaged Food Insiders Consume Discounted Shares

Strategy Filters
by Carr Bettis, PhD
Darden Restaurants Incorporated Looking to Rebound

Inside the Numbers
by Donn Vickrey, PhD, CPA
Yahoo! - The Internet's First Cash Cow

CNBC POWER LUNCH
Monday 12:20 EST Watch....
Craig Columbus, CEO insiderSCORES.com

FAQ/Glossary
Find answers to frequently asked questions and a glossary of terminology used on our site.

{ 620

| CONWAY | D | ASFC | 89 | 2.00 |
| DRAKEMAN | CEO | MEDX | 85 | 32,750 |
| MEREDITH | D | ROGI | 77 | 20,000 |
| GUIRE | CFO | EXAR | 67 | 114,485 |
| LAWLER | D | SMCG | 67 | 4,000 |

(isc) HOW DO THE MOST PREDICTIVE INSIDERS FEEL ABOUT THE MARKET?

All-Stars are insiders who have earned a score of 60 or greater based on prior performances ALL★STAR
*insider sentiment is...*

BULLISH
for this quarter

Click here for All-Star insider; sentiment methodology

|  | DAY | QTR | YTD |
|---|---|---|---|
| ALL-STAR BUYERS | 24 | 350 | 350 |
| ALL-STAR SELLERS | 8 | 241 | 241 |

○ Click here for complete list of today's All-Star Buyers and All-Star Sellers
○ Click here for detailed breakdown of Day, Qtr, YTD by Sector

INTRODUCING THE
INSIDER DREAM TEAM

SIX MONTH RETURN
46 %
Click Here

Company Sleuth

Home | Database Search | Quotes | Commentary | Alerts
Contact Us | Register | Terms of Use | Site Map | Help

FIG. 21

| SELLS | | | | | | | |
|---|---|---|---|---|---|---|---|
| PERSON_ID | SECURITY_ID | PSS | AVG_3MO_RETURN_SELLS | SD_3MO_SELLS | NUM_3MO_DEC_SELLS | AVG_6MO_RETURN_SELLS | SD_6MO_SELLS | NUM_6MO_DEC_SELLS |
| 169 | 6243 | 23 | 0.0871 | 0.126481 | 22 | 0.1924 | 0.1567 | 24 |
| 1809 | 6243 | 33 | 0.0271 | 0.113229 | 6 | 0.1843 | 0.195972 | 6 |
| 4495 | 6243 | 34 | 0.058 | 0.136905 | 9 | 0.107 | 0.180173 | 9 |
| 6198 | 6243 | 13 | 0.1281 | 0.07995 | 2 | 0.3289 | 0.02635 | 2 |
| 6843 | 6243 | 11 | 0.21 | 0.16257 | 3 | 0.3219 | 0.09102 | 4 |

B

| PERSON_ID | SECURITY_ID | PBS | AVG_3MO_RETURN_BUYS | SD_3MO_BUYS | NUM_3MO_DEC_BUYS | AVG_6MO_RETURN_BUYS | SD_6MO_BUYS | NUM_6MO_DEC_BUYS |
|---|---|---|---|---|---|---|---|---|
| 3086 | 2477 | 8 | -0.1672 | 0.043522 | 7 | -0.2781 | 0.03175 | 2 |
| 3759 | 2477 | 90 | 0.0448 | 0.223334 | 22 | 0.3276 | 0.323815 | 17 |
| 5734 | 2477 | 98 | 0.1269 | 0.184025 | 12 | 0.3388 | 0.36713 | 12 |
| 6580 | 2477 | 47 | -0.021 | 0.148246 | 9 | 0.0609 | 0.159049 | 7 |
| 7545 | 2477 | 96 | 0.2787 | 0.119029 | 5 | 0.7172 | 0.203198 | 5 |

SYSTEM, METHOD AND COMPUTER READABLE MEDIUM CONTAINING INSTRUCTIONS FOR EVALUATING AND DISSEMINATING INVESTOR PERFORMANCE INFORMATION

RELATED APPLICATION

This application is a divisional of patent application Ser. No. 09/597,742 filed Jun. 19, 2000 and scheduled to issue as U.S. Pat. No. 7,016,872 on Mar. 21, 2006, which claims priority from U.S. Provisional Application 60/139,771, filed Jun. 18, 1999 which is incorporated herein by reference, and is related to a continuation application of patent application Ser. No. 09/597,742, filed Mar. 20, 2006.

TECHNICAL FIELD

The present invention relates generally to business investment systems, and more particularly, to a system, method, and computer readable medium storing computer executable instructions for evaluating the performance of corporate insiders and other investment traders or investors.

BACKGROUND ART

In the context of securities investments, tracking insider trading has always been considered a prudent exercise. Typically defined as company directors, officers, and other individuals owning more than 10% of its stock, insiders are people who know more about a company's earnings estimates and events affecting it than anyone else. Obviously, by investing their own money, insiders clearly expect to make an above average return when they acquire their own stock in a concerted manner.

Generally speaking, trading securities, or communicating such information to others who trade, based on material non-public information is illegal. Thus, the Securities and Exchange Commission requires insiders to file records of their trading in the company's stock by the tenth day of the month following the trade, at the very latest.

This "Statement of Changes of Beneficial Ownership" or Form 4 for short, lists the number of shares bought or sold, the nature of the transaction, whether direct market or otherwise, and the current holding. Similarly, a Form 3 is filed by an individual establishing an insider position in the company's stock for the first time, and a Form 13D is required to be filed by investors within 10 days of their establishing a 5% stock position in any company. Company directors are required to report their intention to sell unregistered stock under SEC Rule 144.

Clearly, monitoring these SEC filings and information pertaining to the actions of insiders and other investment traders can prove rewarding under certain circumstances. Accordingly, a need exists for a system, method, and computer readable medium containing instructions utilizable for efficiently disseminating such insider and/or investment trader information to the public. With access to this information, the public can make their own assessments and invest accordingly.

Several systems exist in the prior art for providing such information. One example includes on-line databases which track insider holdings, trades, outsider interests, and other investment trader actions. These databases typically list information provided by government agencies such as the SEC within a day or two after publication, and can be a helpful guide to a stock's or other investment's price movement.

While adequately providing access to SEC filings, these on-line databases nevertheless fail to provide any additional insight on the insider's or trader's actions. For instance, the actions of certain insiders or traders may prove to be more reliable in predicting an investment's price movement than other insiders or traders. Thus, a need exists for a system, method, and computer readable medium containing instructions utilizable for providing not only information concerning an insider's or trader's actions, but also information pertaining to the reliability of a particular insider's or trader's actions.

Several prior art techniques have not adequately addressed these needs. For example, U.S. Pat. No. 5,132,899 to Fox discloses a stock and cash portfolio development system. As depicted in prior art FIG. 1 of the present invention (FIG. 1 of Fox), the system of Fox uses data gathering and processing methodology to produce a system where a list of stocks and a cash position is generated and purchased for investment and operating accounts (steps 1-5). Specifically, the system integrates three areas of data: investment performance for investment managers; Federal Securities and Exchange Commission reports filed quarterly by investment managers; and financial characteristics for a number of stocks, to produce a stock portfolio.

Similarly, U.S. Pat. No. 4,566,066 to Towers relates to a securities valuation system. As shown in prior art FIG. 2 of the present application (FIG. 1 of Towers), the system of Towers, comprised of components 10-23, produces securities portfolio valuation schedules for multiple simultaneous users. In Towers, a customer communicates with the system through terminal 10 to access and edit accounts in user file 12. By using a CUSIP routine 18 and an AMOUNT routine to reflect stock splits and dividends since the last stock pricing, the system of Towers produces and displays 23 a selected stock portfolio valuation.

In U.S. Pat. No. 5,812,987 to Luskin et al., an investment fund management system manages assets in one or more investment funds over a specified period of time. This system, comprised of components 31-39, determines a strategic investment mix of assets in a particular fund periodically as a function of changing risk. Each fund is managed by manipulating the investment mix of the fund in accordance with criteria related to a diminishing length of time to a horizon where cash will be withdrawn therefrom. In prior art FIG. 3 of the present invention (FIG. 6 of Luskin et al.), the investment mix is adjusted by first obtaining investor portfolio information 35 and market data 36. This data is used to forecast market risks and returns 37, and to determine the portfolio risk 38. Then, the anticipated cash flow stream 39, the discount function 34, and present value of future cash flow 33 are calculated before producing an optimized portfolio 32 of assets.

In U.S. Pat. No. 5,761,442 to Barr et al., a data processing system selects securities and constructs an investment portfolio based on a set of artificial neural networks (prior art FIG. 4 of the present application, FIG. 2 of Barr et al.). The system comprises components 40-70 and is designed to model and track the performance of each security in a given capital market and output a parameter which is related to the expected risk adjusted return for the security. Each artificial neural network is trained using a number of fundamental and price and volume history input parameters 10, 20, 30 about the security and the underlying index. The system combines the expected return/appreciation potential data 50 for each security via an optimization process 60 to construct an investment portfolio which satisfies aggregate statistics. The data processing system receives input from the capital market and periodically evaluates the performance of the investment portfolio, rebalancing whenever necessary to correct performance degradations 70.

However while many of these prior art references disclose adequate methods of managing investment funds and portfolios, none of the above make any mention of evaluating an insider's or other investment trader's performance. Hence, what is lacking in the prior art is a technique directed not only toward an investment fund, but rather a technique for evaluating insiders and other traders based on their actions as well. Accordingly, a need exists for a system, method, and computer readable medium containing instructions utilizable for not only disseminating information concerning an insider's or trader's actions, but also for evaluating the insider's or trader's performance.

In line with the above, a need exists for a system, method, and computer readable medium containing instructions utilizable not only for providing raw information and data but also utilizable for evaluating performance based on returns observed after decisions concerning buying and selling activity, historical consistency at picking good entry and exit points, and/or the number of buying or selling decisions made by the insider or investing entity.

Furthermore, a need also exists for a system, method, and computer readable medium containing instructions utilizable for not only evaluating performance with respect to substantially all other insiders and traders but also with respect to substantially all other insiders and traders in a particular industry.

SUMMARY OF THE INVENTION

It is a feature and an advantage of the present invention to provide a system, method, and computer readable medium containing instructions utilizable for efficiently disseminating insider and/or investment trader information.

It is another feature and advantage of the present invention to provide a system, method, and computer readable medium containing instructions utilizable for providing not only information concerning an insider or trader's actions, but also information pertaining to the reliability of a particular insider's or trader's actions.

It is another feature and advantage of the present invention to provide a system, method, and computer readable medium containing instructions utilizable for not only disseminating information concerning an insider's or trader's actions, but also for evaluating the insider's or trader's performance.

It is another feature and advantage of the present invention to provide a system, method, and computer readable medium containing instructions utilizable not only for providing raw information and data but also utilizable for evaluating performance based on returns observed after decisions concerning buying and selling activity, historical consistency at picking good entry and exit points, and/or the number of buying or selling decisions made by the insider or investing entity. It is another feature and advantage of the present invention to provide a system, method, and computer readable medium containing instructions utilizable for not only evaluating performance with respect to substantially all other insiders and traders but also with respect to substantially all other insiders and traders in a particular industry.

In accordance with the principles of the present invention, an investor's performance is evaluated by utilizing information pertaining to at least one transaction made by the investor involving at least one investment. This evaluation includes determining a performance score indicative of the investor's performance relative to other investors. The performance score is determined at least in part by considering an average historical performance of the investment, following the transaction. In addition, the performance score is also determined by a historical consistency of the investor's performances with respect to transactions involving the investment, and the number of transactions made by the investor. Then, the performance score of the investor may be compared against the performance scores of other investors. Advantageously, this performance score may be used to produce a ranked list of investors in a particular industry, as well as with investors in different industries.

One embodiment of the present invention, particularly applicable to corporate insiders, is now summarized. Although this example discusses investors that are people and information that is public, other types alternatives are possible. For instance, non person individuals or entities that have similar characteristics as corporate insiders may also be included within the present invention. As an example, entities that have a substantial investment in other entities may also be tracked for their investment strategies. Alternatively, confidential and other nonpublic data may also be used to rank the investing individuals and/or entities, provided that the confidential data is provided on a timely basis. For example, individuals/entities may provide all confidential data to the administrator of the scoring/ranking system of the present invention, which will maintain the specific confidentiality of the present invention, but will also publicize the aggregate score and/or rank of the insiders/entities.

Insider Scoring and Reports

Functional Description

The Insider Scoring is an insider performance measurement. In this example, all of the insiders listed in, for example, a database, in this case, the Insider Universe, are evaluated. All insiders to be evaluated are ranked based on the returns that are observed after their decisions for buying and selling activity (a decision is a cluster of buying, selling or other type of transaction). All insiders are given a performance score for: Buying relative to the Insider Universe, Selling relative to the Insider Universe, Buying relative to the Insider's Respective Industry and Selling relative to the Insider's Respective Industry. This produces a total of four alternative Insider Scores, which when optionally combined provide a unique set of information:

Proven Buy Score—[PBS] represents Buying relative to the Insider Universe

Proven Sell Score—[PSS] represents Selling relative to the insider Universe

Proven Buy Industry Score—[PBIS] represents Buying relative to the Insider's Respective Industry Proven Sell Industry Score—[PSIS] represents Selling relative to the Insider's Respective Industry These scores are calculated on a monthly or other basis. Once the scores have been calculated and inserted into the Database, four reports are produced:
1. Weekly or daily updates of transactions by proven buyers and proven sellers for the Insider Universe (using PBS and PSS to determine the report contents)
2. Weekly or daily updates of transactions by proven buyers and proven sellers divided into Industries (using PBIS and PSIS to determine the report contents)
3. Monthly summary report of newly calculated PBS and PSS scores
4. Monthly summary report of newly calculated PBIS and PSIS scores Data Preparation Steps As part of the process, the following steps are initially completed:

1. Interpreter Backend [IBE]—an optional process which is used to supply and generate the data utilized by the present invention, such as, for instance, individual returns, average returns, statistical values such as standard deviations, variances and the like, and/or counts of the number of decisions, any of which may be used for the calculations (in other embodiments, the above data are gathered by the system of the present invention itself).
2. IBE data relating to Trusts and Companies or other non-person entities are optionally, in this example, removed from the database (dB). In other embodiments, non-person entities may also be tracked. For example, a closely held company may optionally be considered as a person or an insider.

Proven Insider Scoring Logic—Raw Buy Score

The following logic is used to calculate the raw buy and sell scores which are the preprocessed scores that will optionally undergo statistical processing/weighing and/or filtering for all person/security combinations in the dB with at least 2 buy or sell decisions that are at least 26 weeks old. These raw scores are later ranked to formulate the final scores:

Raw Buy Score—all inputs are based on calculated values related to buy decisions For every person_id and security_id combination in the person_security_total table with 2 or more buy decisions, a raw buy score is calculated using the following logic (the logic is first summarized and then described in detail below):

Step 1 Calculate the average 13 week and 26 week (or other time intervals) returns for buy decisions [13/26 buy decision returns] for each person/security combination Step 2 Calculate the t-statistic [t-stat] values for 13/26 buy decision returns in absolute terms Step 3 Calculate the degrees of freedom [DF] values for 13/26 buy decision returns Step 4 Look up probability value using DF and |t-stat| for 13/26 buy decision returns Step 5 Calculate raw buy score using conditional logic Step 6 Calculate adjustment to raw buy score Step 7 Calculate adjusted raw buy score Step 8 Sort and rank the raw buy scores to produce the final Proven Buy Scores; PBS and PBIS will rely on the same raw score, but are differentiated by the manner in which they are ranked (see following section).

For every person_id and security_id combination in the person_security_total table in the dB with person security_total.num_6mo_dec_buys>=2, the following logic is performed:

Step 1

The 13 week and 26 week return values are calculated by IBE for each person/security combination which generally relate to historical transactions:

Average 13week return=person security_total.avg_3mo_return buys

Average 26week return=person security_total.avg_6mo return buys

Step 2

The t-stat, a standard measure of confidence, is calculated in absolute terms (i.e., a non-negative number) for both the 13 week and 26 week returns using the following formulas:

The 13/26week_abs_tstat_buy values should be rounded to 2 decimal places

To ensure that division by zero does not occur, if the standard deviation is zero, the final raw score is set to zero.

IF person security_total.sd_3mo_buys=0, THEN rawscore-buy=0

And start over with the next person/security buy combination

IF person security total.sd_6mo buys=0, THEN rawscore-buy=0

And start over with the next person/security buy combination $$13\text{week\_abs\_tstat\_buy} = \left| \frac{\text{person\_security\_total.avg\_3mo\_return\_buys}}{\left( \frac{\text{person\_security\_total.sd\_3mo\_buys}}{\sqrt{\text{person\_security\_total.num\_3mo\_dec\_buys}}} \right)} \right|$$

$$26\text{week\_abs\_tstat\_buy} = \left| \frac{\text{person\_security\_total.avg\_6mo\_return\_buys}}{\left( \frac{\text{person\_security\_total.sd\_6mo\_buys}}{\sqrt{\text{person\_security\_total.num\_6mo\_dec\_buys}}} \right)} \right|$$

Other time intervals or similar algorithms may be used that are indicative of the measure of confidence of the insider.

Step 3

The degrees of freedom are simply calculated by subtracting 1 from the number of observations for each return value:

13week_$df$_buy=person security total.num_3mo_dec_buys−1

26week_$df$_buy=person_security_total.num_6mo_dec_buys−1

Step 4

For each return period, using the absolute t-stat and DF for each respective calculation as inputs to a lookup table the probability is determined:

IF 13/26week_$df$_buy>100, THEN set 13/26week_$df$_buy=100

IF 13/26week_abs_$tstat$_buy>20, THEN set 13/26week_abs_$tstat$_buy=20

IF 13/26week_abs_$tstat$_buy<0.01, THEN set 13/26week_prob buy=0

13week_prob_buy=lookup value indicated by using 13 week_abs_tstat_buy and 10 13week_df_buy 26week_prob buy=lookup value indicated by using 26 week_abs_tstat_buy and 26 week_df_buy Other standard or similar probability determination processes or predetermined criteria may also be used. Other threshold values may also be used. In addition, the specific time periods may be altered. The above modifications and all other modifications/alternatives are relevant to all embodiments of the present invention.

Step 5

The conditional raw score is now calculated. The conditional raw score is based on the average of the conditional raw scores for the 13 week period and for the 26 week period, which are then multiplied by 100. The condition to determine whether the probability is added or subtracted is based on whether the average return is positive or negative, the formula is as follows:

$$\text{cond\_raw\_score\_buy} = \left\{ \frac{[1-(.5 + \text{or} - 13\text{week\_prob\_buy})] + [1-(.5 + \text{or} - 26\text{week\_prob\_buy})]}{2} \right\} * 100$$

Logic:

13 week portion of calculation

IF person security_total.avg 3mo return_buys>0
  THEN subtract 13 week_prob buy from 0.5 in numerator
  This next case means that a negative average return for the buy decisions exists and that the probability must be added
  ELSE add 13 week_prob buy to 0.5 in numerator 26 week portion of calculation IF person_security_total.avg 6mo return buys>0
  THEN subtract 26 week prob buy from 0.5 in numerator
  This next case means that a negative average return for the buy decisions exists and that the probability must be added
  ELSE add 26 week prob buy to 0.5 in numerator Alternatively, the conditional raw score may be the median raw score, a subset grouping of the average/median, weighted average or median, or some other selection based on predetermined criteria consistent therewith. Final step The two above calculated values are averaged and multiplied by 100. Other methods of statistically weighing or assessing the conditional raw score may be used, such as median, standard deviation, and other standard statistical methods. Other time durations may also be selected.

Step 6

The adjustment to the conditional raw buy score is calculated using the following formula (the adjustment will always be negative):

$$\text{adj\_raw\_buy} = (-20) * \left| \frac{1}{\sqrt{\frac{\text{num\_3mo\_dec\_buys} + \text{num\_6mo\_dec\_buys}}{2}}} \right|$$

num 3mo dec buys and num-6mo dec buys are both taken from the person security total table Other standard adjustment methods may also be used that provide similar or analogous results.

Step 7

The raw buy score is calculated by adding the adjustment to the conditional raw score:

raw–score–buy=(cond raw score buy)+(adj raw buy)

here a negative number is added, therefore the adjustment should always be negative Other standard processes may be used to arrive at a consistent raw buy score. For example, the raw buy score may be scaled or undergo mathematical conversion.

Step 8—Ranked Score

The following ranking system is used to determine the final scores for the proven insider scores:

PBS—Proven Buy Score

Once all of the raw buy scores have been calculated, the raw buy scores are ranked by sorting the results in descending order and separating this list into 100 equal groups. The group with the highest set of scores is given the ranking of 100 (signifying the best proven buy performance), and the group with the lowest set of scores is given the ranking of I (signifying the worst buy performance). The insiders in each group are then assigned a PBS score equal to the group that they are in.

Step 1 Sort raw buy_score descending for all person id/security_id where there is a score Step 2 Divide all scores into 100 equal groups, or into 100 groups based on distributional properties Step 3 Assign PBS score of 100 to highest ranking group and record the PBS score for the associated person-id and security id combinations in the group Step 4 Repeat for the remaining groups, in all there should be scores ranging between 100-I for an equal amount of insiders in each group Of course additional or alternative statistical processes and weights may be applied in a standard manner for performing the ranking. These alternatives apply to all scores described herein.

PBIS—Proven Buy Industry Score

The PBIS is very similar to the PBS score except that all insiders are divided into their respective industries and then separated into 100 equal groups and assigned their PBIS scores.

Step 1 Group each insider into their respective industry

Step 2 Sort raw_buy_score descending for all person_id/security_id where there is a score separately for each industry Step 3 Divide all scores in each industry into 100 equal groups, or into 100 groups based on distributional properties; if there are not 100 insiders in an industry then consider each insider sign rankings using the following increments, rounding to the nearest whole number: [100/number of insiders in industry]

Step 4 Assign PBIS score of 100 to highest ranking group and record the PBIS score for the associated person-id and security id combinations in the group, see above if there are not 100 insiders in an industry Step 5 Repeat for the remaining groups, in all there should be scores ranging between 100-I for an equal amount of insiders in each group Raw Sell Score—All inputs are based on calculated values related to sell decisions For every person-id and security-id combination in the person_security_total table with 2 or more sell decisions, a raw sell score using the following logic is calculated (the logic is first summarized and then explained in detail):

Step 1 Calculate the average 13 week and 26 week (or other time intervals) returns for sell decisions [13/26 sell decision returns] for each person/security combination (done by IBE)

Step 2 Calculate the t-statistic [t-stat] values for 13/26 sell decision returns in absolute terms Step 3 Calculate the degrees of freedom [DF] values for 13/26 sell decision returns Step 4 Look up probability value using DF and |t-stat| for 13/26 sell decision returns Step 5 Calculate raw sell score using conditional logic Step 6 Calculate adjustment to raw sell score Step 7 Calculate adjusted raw sell score Step 8 Sort and rank the raw sell scores to produce the final Proven Sell Scores; PSS and PSIS rely on the same raw score, but are differentiated by the manner in which they are ranked (see following section).

For every person id and security_id combination in the person security total table in the 20 dB with person security_total. num 6mo dec sells>=2, the following logic is performed:

Step 1

The 13 week and 26 week return values are calculated by IBE for each person/security combination:

Average 13week return=person_security total.avg 3mo_return_sells

Average 26week return=person_security_total.avg 6mo return_sells

Step 2

The t-stat is calculated in absolute terms (i.e., a non-negative number) for both the 13 week and 26 week returns using the following formulas:

The 13/26 week abs tstat sell values should be rounded to 2 decimal places

To ensure that division by zero does not occur, if the standard deviation is zero, then the final raw score is set to zero.

IF person_security_total.sd 3mo sells=0, THEN raw-score-sell=0 And start over with the next person/security buy combination IF person_security total.sd 6mo sells=0, THEN raw-score-sell=0 And start over with the next person/security buy combination $$13\text{week\_abs\_tstat\_sell} = \left| \frac{\text{person\_security\_total.avg\_3mo\_return\_sells}}{\left(\frac{\text{person\_security\_total.sd\_3mo\_sells}}{\sqrt{\text{person\_security\_total.num\_3mo\_dec\_sells}}}\right)} \right|$$

$$26\text{week\_abs\_tstat\_sell} = \left| \frac{\text{person\_security\_total.avg\_6mo\_return\_sells}}{\left(\frac{\text{person\_security\_total.sd\_6mo\_sells}}{\sqrt{\text{person\_security\_total.num\_6mo\_dec\_sells}}}\right)} \right|$$

Other time intervals or similar algorithms may be used that are indicative of the measure of confidence of the insider.

Step 3

The degrees of freedom are simply calculated by subtracting 1 from the number of observations for each return value:

13week $df\_$sell=person_security_total.num__3modec sells-$1$

26week $df$ sell=person_security jotal.num__6mo dec sells-1

Step 4

For each return period, lookup the probability using the absolute t-stat and DF for each respective calculation as inputs to a lookup table:

IF 13/26week__$df\_$sell>100, THEN set 13/26week__$df\_$sell=100

IF 13/26week_abs__$tstat\_$sell>20, THEN set 13/26week_abs__$tstat\_$sell=20

IF 13/26week_abs__$tstat\_$sell<0.01, THEN set 13/26week_prob_sell=0

13week_prob_sell=lookup value indicated by using 13 week_abs_tstat_sell and 13 week_df_sell 26 week_prob_sell=lookup value indicated by using 26 week_abs_tstat_sell and 26 week_df_sell Other standard or similar probability determination processes or predetermined criteria may also be used. Other threshold values may also be used. In addition, the specific time periods may be altered. The above modifications and all other modifications/alternatives are relevant to all embodiments of the present invention.

Step 5

The conditional raw score is now calculated. The conditional raw score is based on the average of the conditional raw scores for the 13 week period and for the 26 week period, which are then multiplied by 100. The condition to determine whether the probability is added or subtracted is based on whether the average return is positive or negative, the formula is as follows:

$$\text{cond\_raw\_score\_sell} = \left\{ \frac{[1-(.5 + \text{or} - 13\text{week\_prob\_sell})] + [1-(.5 + \text{or} - 26\text{week\_prob\_sell})]}{2} \right\} * 100$$

Logic: (Note: We are now using less than zero, which is opposite of the Buy logic)

13 Week Portion of Calculation

IF person_security_total.avg 3mo_return–sells<0
  THEN subtract 13week_prob_sell from 0.5 in numerator
  This next case means that we have a positive average return for the sell decisions and we need to add the probability
  ELSE add 13 week_prob_sell to 0.5 in numerator 26 Week Portion of Calculation IF person_security_total.avg 6mo return–sells<0
  THEN subtract 26 week_prob sell from 0.5 in numerator
  This next case means that we have a positive average return for the sell decisions and we need to add the probability
  ELSE add 26 week_prob sell to 0.5 in numerator
  Alternatively, the conditional raw score may be the median raw score, a subset grouping of the average/median, a weighted average or median, or other selection based on predetermined criteria consistent therewith. Final step The two above calculated values are arranged and multiplied by 100. Other methods of statistically weighing or assessing the conditional raw score may be used, such as median, standard deviation, and other standard statistical methods. Other time durations may also be selected.

Step 6

The adjustment to the conditional raw sell score is calculated using the following formula (the adjustment will always be negative):

$$\text{adj\_raw\_sell} = (-20) * \left| \frac{1}{\sqrt{\frac{\text{num\_3mo\_dec\_sells} + \text{num\_6mo\_dec\_sells}}{2}}} \right|$$

num__3mo_dec_sells and num__6mo_dec_sells are both taken from the person_security_total table Step 7

The raw sell score is calculated by adding the adjustment to the conditional raw score:

raw_score_sell=(cond_raw_score_sell)+(adj_raw_sell)— here a negative number is added, therefore the adjustment should always be negative Step 8—Ranked Score The following ranking system is used to determine the final scores for the proven insider scores:

PSS—Proven Sell Score

Once all of the raw sell scores have been calculated, the raw sell scores are ranked by sorting the results in descending order and separating this list into 100 equal groups. The group with the highest set of scores is given the ranking of 100 (signifying the best proven sell performance), and the group with the lowest set of scores is given the ranking of 1 (signifying the worst sell performance). The insiders in each group are then assigned a PSS score equal to the group that they are in.

Step 1 Sort raw_sell_score descending for all person_id/security_id where there is a score Step 2 Divide all scores into 100 equal groups, or into 100 groups based on distributional properties Step 3 Assign PSS score of 100 to highest ranking group and record the PSS score for the associated person_id and security_id combinations in the group Step 4 Repeat for the remaining groups, in all there should be scores ranging between 100-1 for an equal amount of insiders in each group PSIS—Proven Sell Industry Score The PSIS is very similar to the PSS score except that all insiders are divided into their respective industries and then separated into 100 equal groups and assigned their PSIS scores.

Step 1 Group each insider into their respective industry

Step 2 Sort raw_sell_score descending for all person_id/security_id where there is a score separately for each industry Step 3 Divide all scores in each industry into 100 equal groups, or into 100 groups based on distributional properties; if there are not 100 insiders in an industry then consider each insider as a group and assign rankings using the following increments, rounding to the nearest whole number: [100/number of insiders in industry]

Step 4 Assign PSIS score of 100 to highest ranking group and record the PSIS score for the associated person_id and security id combinations in the group, see above if there are not 100 insiders in an industry Step 5 Repeat for the remaining groups, in all there should be scores ranging between 100-1 for an equal amount of insiders in each group As mentioned above, the above summarized embodiment is particularly useful in evaluating corporate insiders. It should, however, also be noted that the concepts of the present invention are equally applicable for evaluating other types of investors. For instance, bond and mutual fund investors, just to name a few, may also be evaluated in accordance with the concepts of the present invention.

Hence, to achieve the these goals and to address the above and other problems of the prior art, the present invention provides a method, system, and computer readable medium storing computer executable instructions for evaluating an investor's performance by utilizing information pertaining to at least one transaction made by the investor involving at least one investment. In one embodiment, the present invention includes determining a performance score indicative of the investor's performance relative to other investors. The performance score is determined at least in part by considering an average historical performance of the at least one investment following the at least one transaction, a historical consistency of the investor's performances with respect to transactions involving the at least one investment, and the number of transactions made by the investor. This embodiment also includes comparing the performance score of the investor against performance scores of other investors.

In another embodiment, the present invention provides a method, system, and computer readable medium storing computer executable instructions for use in producing a ranked list of investors according to an evaluation of the investors' performances relating to at least one transaction made by the investors involving investments associated with the investors. In one embodiment, the invention includes retrieving a list of investors and generating an evaluation list by removing investors failing to meet predetermined criteria from the list. This embodiment also includes calculating a performance score for each investor listed on the evaluation list indicative of the investor's performance by considering an average historical performance of an investment following a transaction by the investor, a historical consistency of the investor's performances with respect to transactions involving the at least one investment, and the number of transactions made by the investor. Also included in this embodiment is the step of calculating, for each investor using the performance scores, a final transaction score indicative of the investor's relative performance with respect to all investors on the evaluation list.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

Other objects of the present invention will be evident to those of ordinary skill, particularly upon consideration of the following detailed description of the preferred embodiments.

NOTATIONS AND NOMENCLATURE

The detailed descriptions which follow may be presented in terms of program procedures executed on computing or processing systems such as, for example, a standalone gaming machine, a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

BRIEF DESCRIPTION OF THE DRAWINGS

FIGS. 6a-6b depict another example of a user interface utilizable for displaying an investor evaluation according to the principles of the present invention;

FIG. 21 shows a set of tabulated results of an evaluation performed according to the principles of the present invention.

BEST MODE FOR CARRYING OUT THE INVENTION

Reference now will be made in detail to the presently preferred embodiments of the invention. Such embodiments are provided by way of explanation of the invention, which is not intended to be limited thereto. In fact, those of ordinary skill in the art may appreciate upon reading the present specification and viewing the present drawings that various modifications and variations can be made.

For example, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

In accordance with the principles of the present invention, an investor's performance is evaluated by utilizing information pertaining to at least one transaction made by the investor involving at least one investment. This evaluation includes determining a performance score indicative of the investor's performance relative to other investors. The performance score is determined at least in part by considering an average historical performance of the investment, following the transaction. In addition, the performance score is also determined by a historical consistency of the investor's performances with respect to transactions involving the investment, and the number of transactions made by the investor. Then, the performance score of the investor may be compared against the performance scores of other investors. Advantageously, this performance score may be used to produce a ranked list of investors in a particular industry, as well as with investors in different industries.

Figure 1:
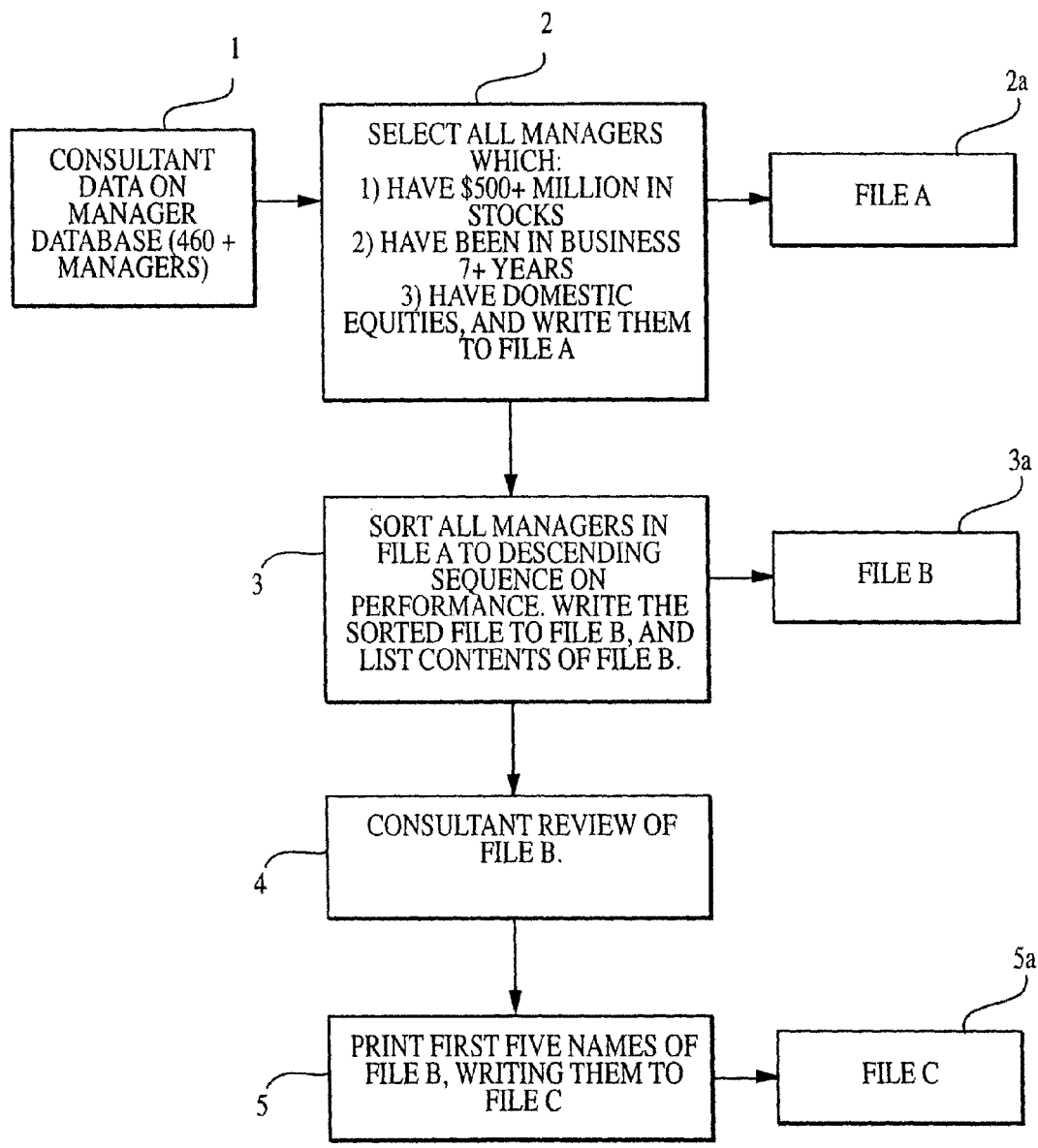
FIG. 1 illustrates a prior art stock and cash portfolio development system.
Figure 2:
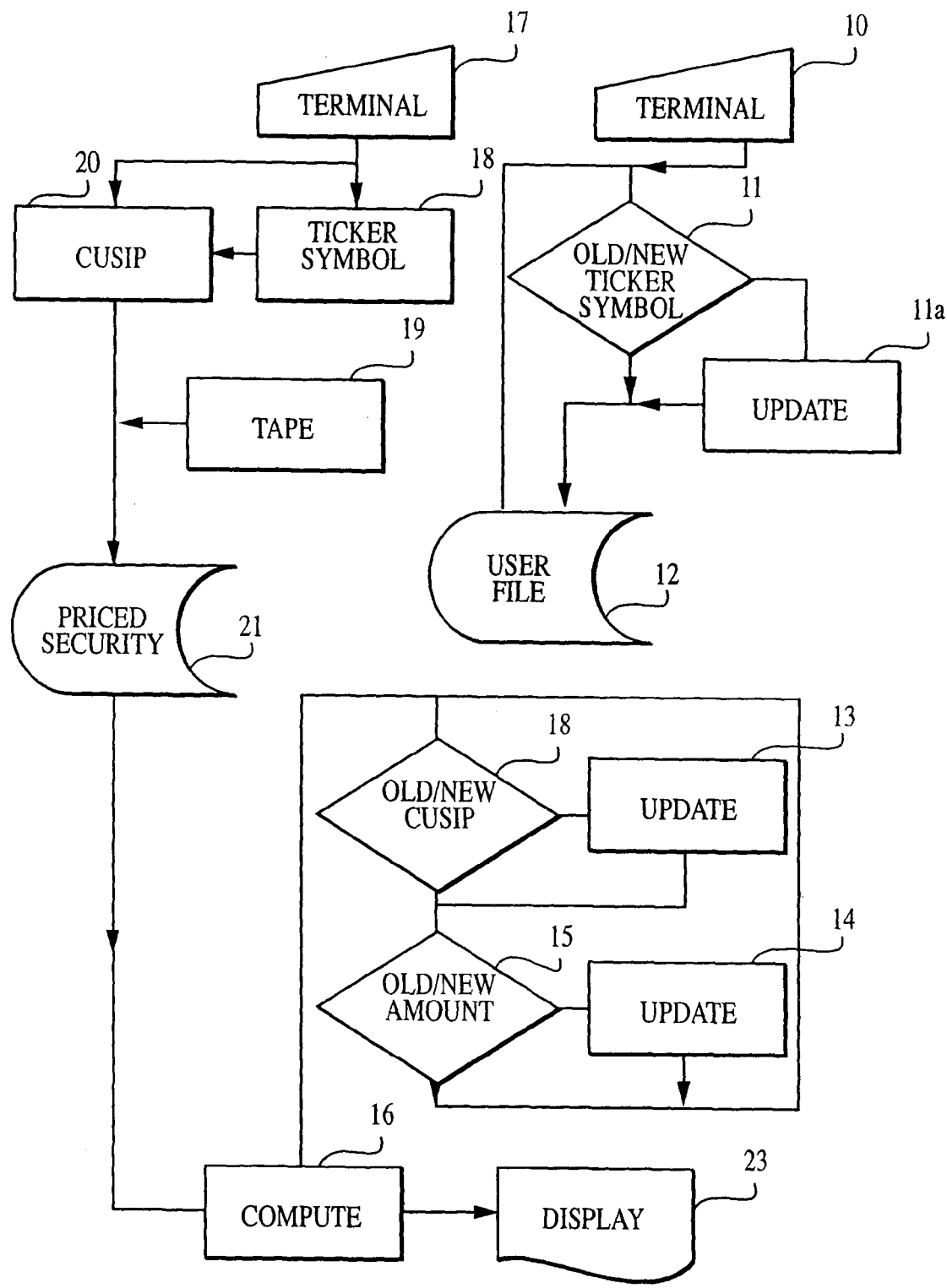
FIG. 2 illustrates a prior art securities valuation system.
Figure 3:
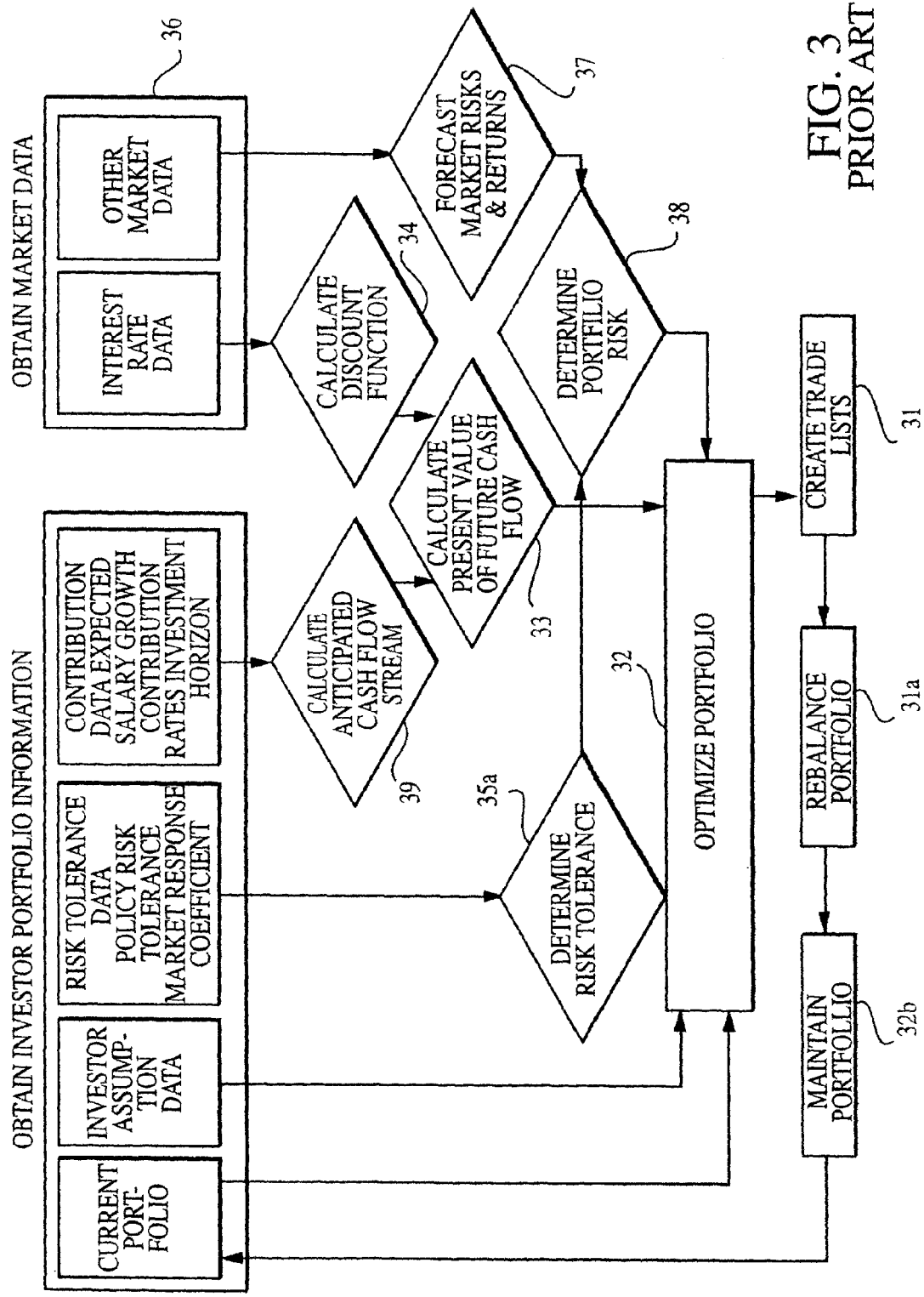
FIG. 3 illustrates a prior art investment fund management system.
Figure 4:
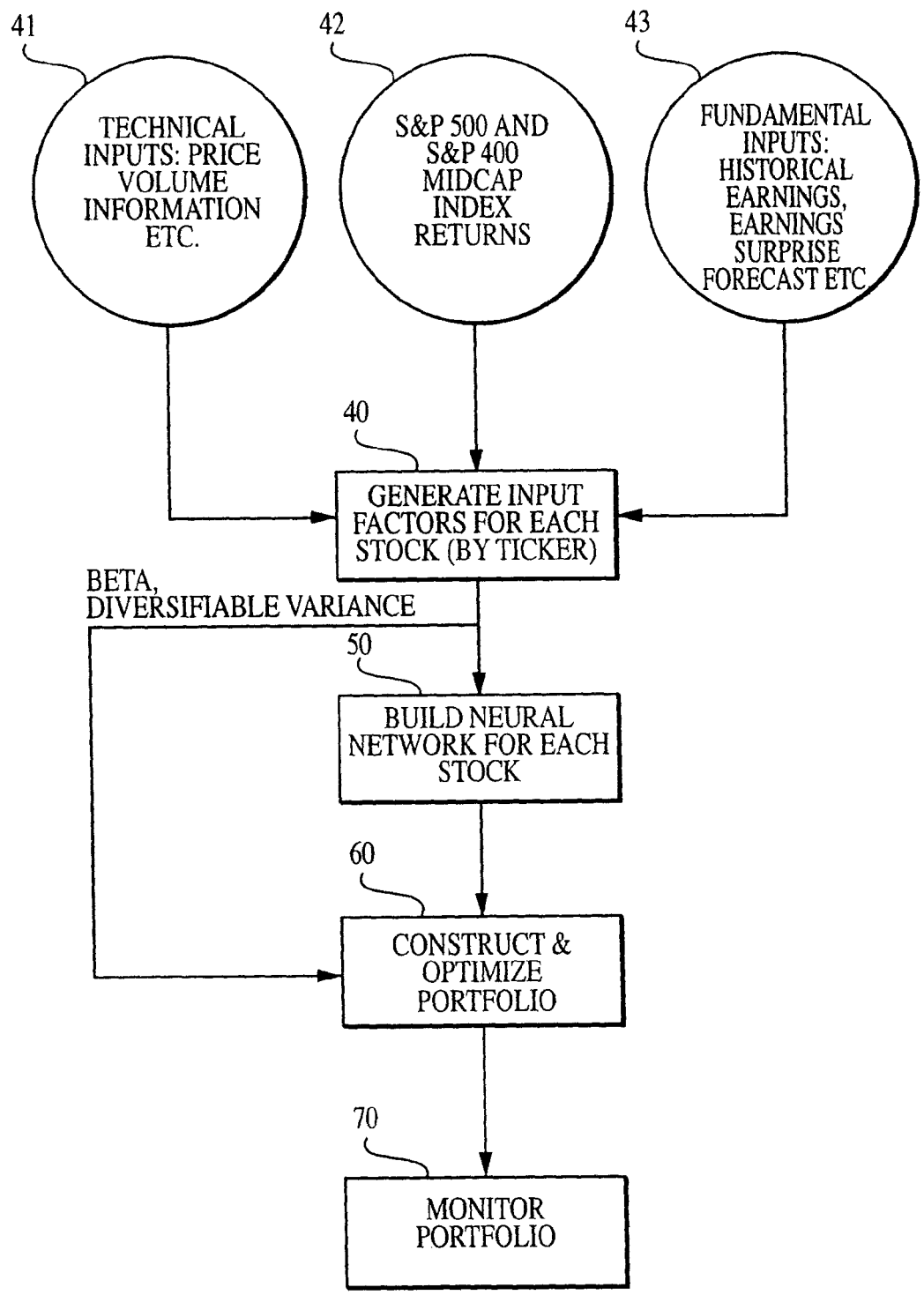
FIG. 4 illustrates a prior art data processing system for selecting securities and constructing investment portfolios based on a set of artificial neural networks.
Figure 5:
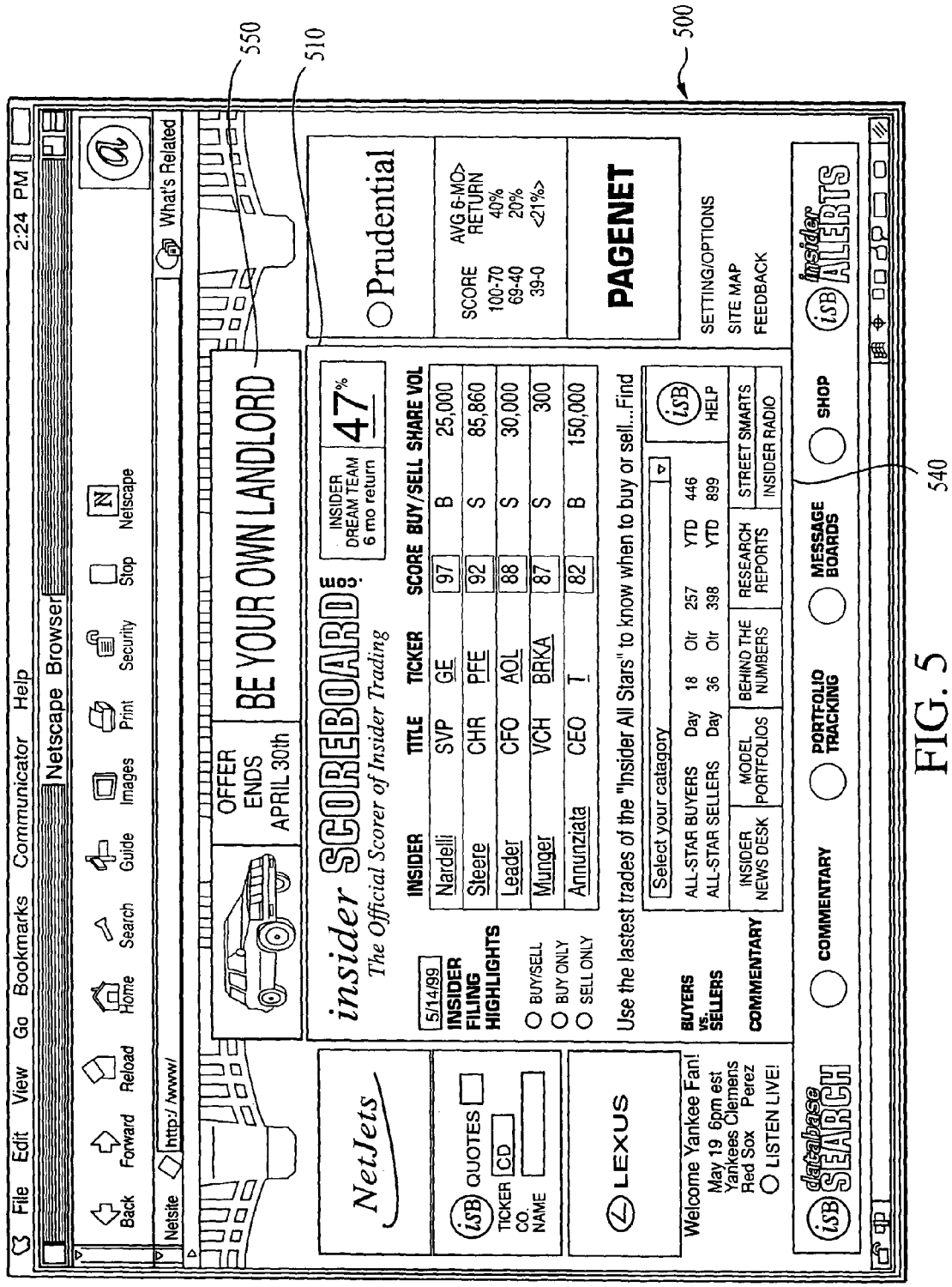
FIG. 5 depicts one example of a user interface utilizable for displaying an investor evaluation according to the principles of the present invention.

Referring first to FIG. 5, one example of a user interface 500 utilizable for displaying, for example, investor performance scores is illustrated. In FIG. 5, the user interface displays a wide variety of information including the performance scores of a number of investors 510. In this example, a predetermined number of high performing investors with respect to both buying and selling transactions for a particular date are listed. Alternatively, the user may just as easily elect to view a list of only the investors having the highest selling transaction performance scores or of only the highest buying transaction performance scores.

Advantageously, these performance scores are a measure of the predictive nature of the investor's trading decisions. The higher the score (with one-hundred, for example, being the highest), the more predictive on a historical basis. Furthermore, the performance score increases with the number of beneficial transactions. For instance, the performance score increases when a rate of return of an investment increases and the transaction is a buy transaction, or when a rate of return of the investment decreases and the transaction is a sell transaction. Likewise, the performance score decreases when a rate of return of the investment decreases and the transaction is a buy transaction, or when a rate of return of the investment increases and the transaction is a sell transaction. Thus, a high buy score corresponds to historically high positive returns (i.e., the investor purchased a stock, and the stock went up in value). Similarly, a high sell score corresponds to high negative returns (i.e., they sold the stock, and the stock went down in value). In addition, it should be noted that although in this particular embodiment corporate securities are mentioned as being one example of the investor's trading decision or investment, the instant invention is also applicable to and should be construed as encompassing any other form of similar investment. Some examples include bonds, currencies, commodities, paper, precious metals, minerals, natural resources, mutual funds, and the like or any other analogous investments and/or investment entities.

As will be discussed in greater detail below, several factors are incorporated into these performance scores. For instance, an investor's average return history for both buys and sells may be considered. Indeed in many embodiments this factor is accorded the greatest amount of weight. Second, the investor's historical consistency at picking good entry and exit points in their own company's stock, as measured by, for example, standard deviation, is also considered.

Finally, the number of decisions that make up an investor's track record is factored into the performance score for the simple reason that the more times an investor has demonstrated good timing the better. Other factors are optionally used as well.

In addition to listing the highest performing investors, interface 500 may also be linked to or used to display information concerning each investor and/or the corresponding security. Hence, in FIG. 5, the investor Nardelli is listed as being a senior vice president of General Electric and as having a share volume of 25,000. Furthermore, the interface sponsor may optionally include commentary concerning, for example, any securities or investors, advertisements utilizable as a source of revenue 550, instructions or help information for beginning users, and information concerning or tracking the activities of exceptionally high performing investors, such as, for example the total number of transactions made by a list of "All Star" investors (determined in this embodiment by having a performance score above a predetermined level) 540, or other similar features.

In FIG. 6, a second example of a user interface is depicted. Whereas the interface in FIG. 5 depicts a tabulation of investors with high buying and selling performance scores listed together, here the listing of investors is separated into separate lists of high performing buy investors 610 and high performing sell investors 620. Like the example in FIG. 5, interface 601 also lists the total number of transactions made by a list of "All Star" investors during the current day, quarter and/or year.

The embodiments of FIGS. 5 and 6 depict interfaces that advantageously score insiders/entities in a manner consistent with sporting events. For example, the user interfaces in these examples simulate a baseball scoreboard. Advantageously, these scoreboards provide and it is customary to also include advertisements that can be sponsored by actual sponsors. Thus, this type of user interface provides a framework for which the public is accustomed to reviewing and understanding information, in a context of ranking insiders/entities that the public may use when investing and/or tracking market trends. Of course, other types of scoreboards may also be use, as appropriate. For example, football, basketball, soccer, and/or hockey scoreboards, and the like may also be used.

In use, a user may advantageously view the information provided by the interfaces depicted in FIGS. 5 and 6, in this case, the highest performing investors with respect to either buy and/or sell transactions. Alternatively, a user may select a particular investor or investing entity for review. Similarly, a user may select any combination of entities or sets/groupings of data including, for example, all investors dealing with or investing in a particular corporation or investment, or other analogous listings of information.

Figure 7:
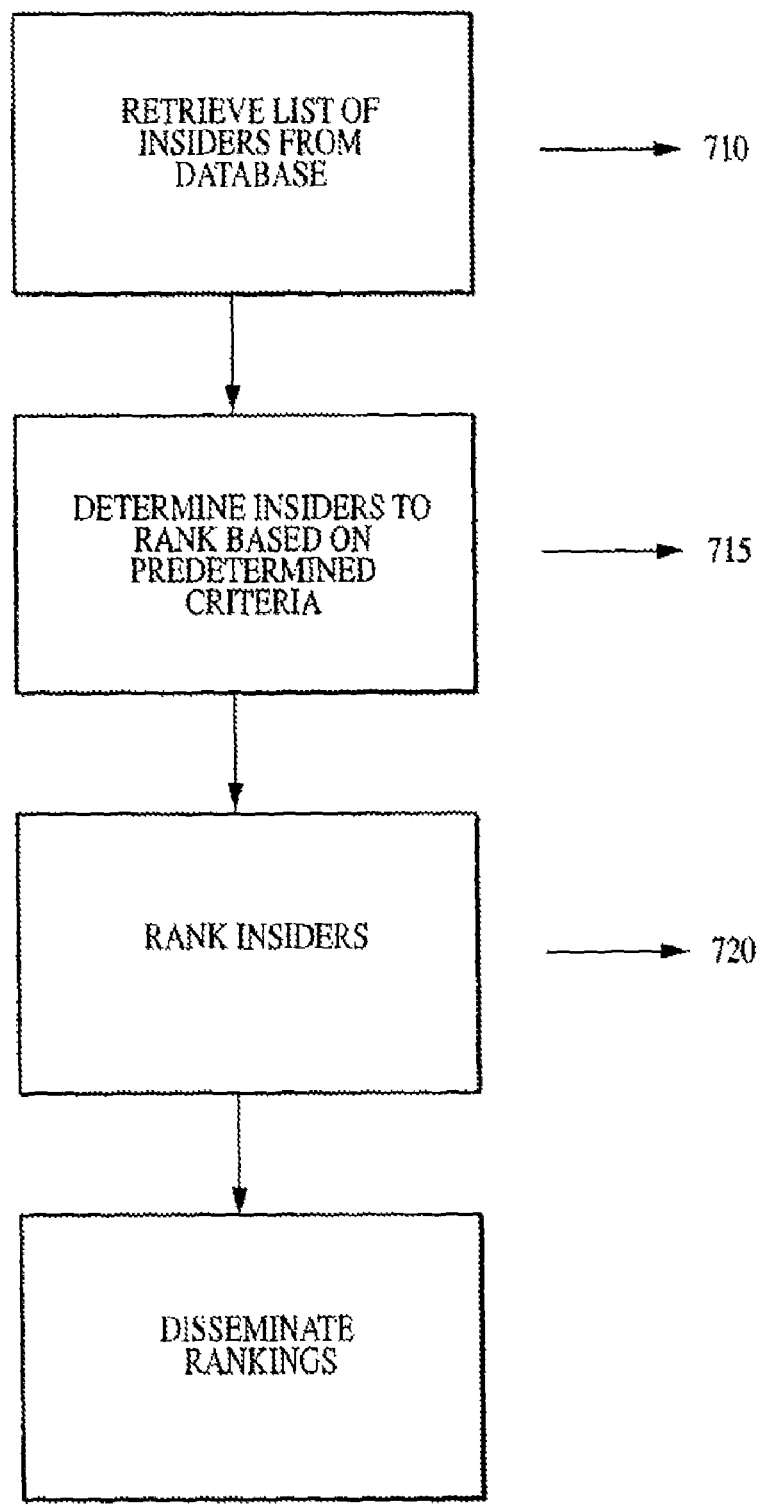
FIG. 7 is a flow diagram illustrating a process for evaluating investors according to the principles of the present invention.

A broad overview of the process of one embodiment of the present invention is now illustrated in FIG. 7. First, a list of investors is retrieved from one or any number of databases 710. In this particular embodiment, the database includes a list of all of the insiders filing insider documents with the SEC. In other embodiments, other similar or analogous techniques may be utilized to generate a list of investors. For example, any one of a variety of databases tracking industry leaders may just as easily be used.

After retrieving the list of investors, a smaller list of investors to be evaluated is optionally generated according to predetermined criteria 715. In one example, three optional criteria are used to generate this list. First, each investor may be required to be an actual living person. Thus, using the insider example mentioned above, any entities filing insider documents that are not people, such as companies, partnerships, or trusts, are removed from the evaluation list. Second, the market capitalization of the company at which the insider is affiliated may be required to be greater than a predetermined amount, such as, for instance, $50 million. Third, each investor may be required to have made a minimum number of trades, such as having traded at least two times in the past ten years and/or once in the last five years. Thus, in this example, investors may optionally include living people investing in companies having a market capitalization of at least $50 million and have traded at least two times in the past ten years or once in the last five years. These requirements are disclosed for exemplary reasons only and it is to be understood that other types of investors are possible within the scope of the invention. For instance, non-people investors such as partnerships, corporations, and other joint ventures or entities are also possible. Similarly, entities not having market capitalization or trading limits are also possible. Furthermore, the concepts of the present invention are applicable to entities investing in investments other than securities, such as bonds, mutual funds, or any other similar investments.

After generating the list of investors to be evaluated, processing continues with the actual ranking of the investors 720. This ranking, as will be discussed in greater detail below, includes the determination, of one or more of a number of performance scores for each investor listed, including, for example, raw buy and sell performance scores, buy and sell performance scores relative to all investors listed in the evaluation list (proven buy and sell scores), and industry wide buy and sell performance scores (or proven buy and sell industry scores). As will be discussed below, the invention is not limited to just the above proven buy and sell scores and proven buy and sell industry scores. To the contrary, other performance scores and rankings are also possible including, for example, rankings based on other groupings. From there, the rankings produced in 720 may optionally be disseminated via, for example, one of the user interfaces depicted in FIG. 5 or 6. Alternatively, the rankings may be disseminated in any other similar or analogous medium, such as in a magazine or newspaper, a trade journal, television, and radio or the like.

Although in this embodiment a list of investors to be evaluated is determined by the present invention, it is to be understood that other alternatives are also possible. For instance, the present invention is to be construed as including scenarios where a user enters or inputs a predetermined listing of investors for evaluation. In such a case, only the particular entities entered by the user would be evaluated. Likewise, it is also possible that a mixed grouping of investment entities may be evaluated. For instance, it is possible within the scope of the present invention to evaluate a listing of investors which includes corporate insiders, nonperson joint ventures, and/or corporations, and any other types of investment entities or combinations thereof.

Figure 8:
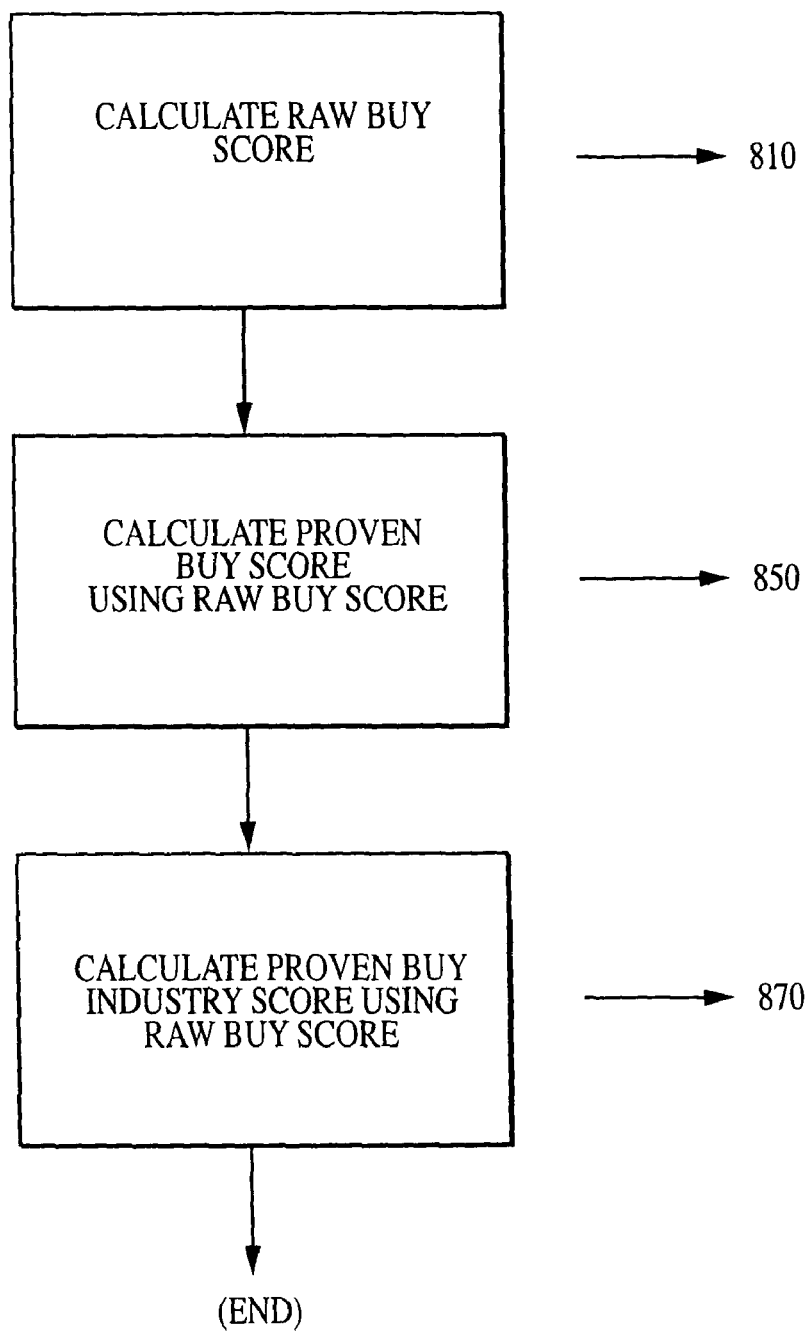
FIG. 8 is a flow diagram illustrating a high level process for generating a buy performance measure utilizable in the process of FIG. 7.

In accordance with the principles of the present invention, an overview of the calculation of buy performance scores is illustrated with reference to FIG. 8. Initially, a raw buy score, which as mentioned above is indicative of an investor's buy performance, is calculated 810. This raw buy score, then, is optionally manipulated and utilized in the generation of an optional proven buy score 850 and in the generation of an optional proven buy industry score 870. The proven buy score, as mentioned briefly above, is a ranking or an indication of the investor's buy performance as measured with respect to all other evaluated investors. On the other hand, the proven buy industry score is a ranking or an indication of the investor's buy performance as measured with respect to all other evaluated investors in the investor's own industry. Of course, other scores are also possible. For instance, it is possible that rankings or proven scores may be calculated reflecting relative performance based on geographical regions, between only particular types of entities such as only non-profit organizations or entities, or investors involved with a particular corporation, and the like.

Figure 9:
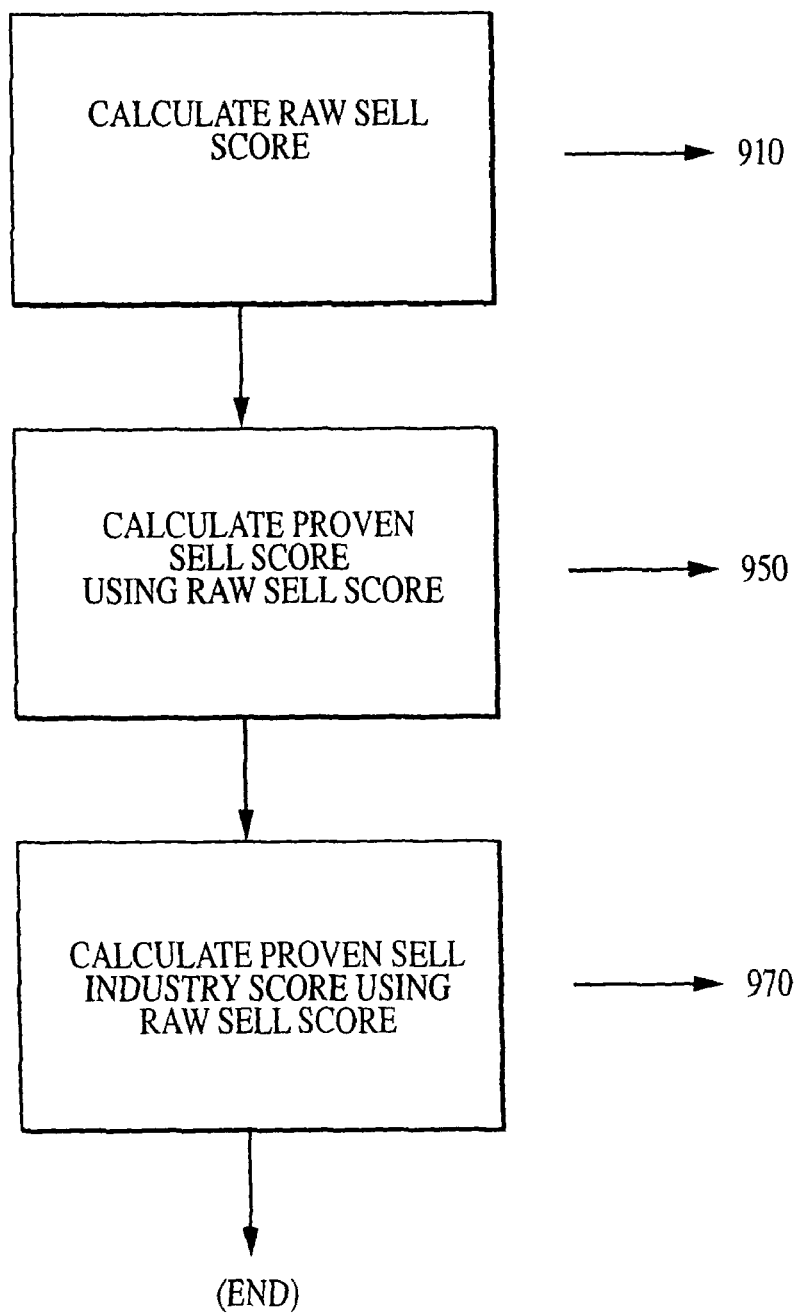
FIG. 9 is a flow diagram illustrating a high level process for generating a sell 10 performance measure utilizable in the process of FIG. 7.

A similar procedure is performed for calculation of sell performance scores. Referring to FIG. 9, a raw sell score, which in contrast to the raw buy score is indicative of an investor's sell performance, is calculated 910. Like the above procedure, the raw sell score is optionally utilized in the generation of an optional proven sell score 950 and in the generation of an optional proven sell industry score 970. As may be evident from the discussion above, the proven sell scores rank the individual investors' sell performance and are used to evaluate the investor's performance with respect all other investors in the evaluation list. Likewise, the proven sell industry scores rank the individual investor's sell performance in the investors' industry and are used to evaluate the investor's performance with respect all other investors in the investor's own industry.

In accordance with the principles of the present invention and as discussed briefly above, these scores or measures reflect an investor's or entity's performance and are generated by considering a number of performance factors. For instance, generation of the scores may include a measure of the investor's historical performance. One method used to measure such performance includes, for example, the return value of the investor's investment as determined at certain time intervals after the investment. Another example may include considering the investors' success at selecting entry and exit points in the investor's investment. Additionally, the investor's performance score or measure may be modified or weighted based on the amount of transactions made by the investor or other similar factors. Of course, the above factors are listed for exemplary reason only and it is to be understood that other similar and analogous factors may also be considered so long as they provide an accurate measurement of the investor's success or lack thereof.

Figure 10:
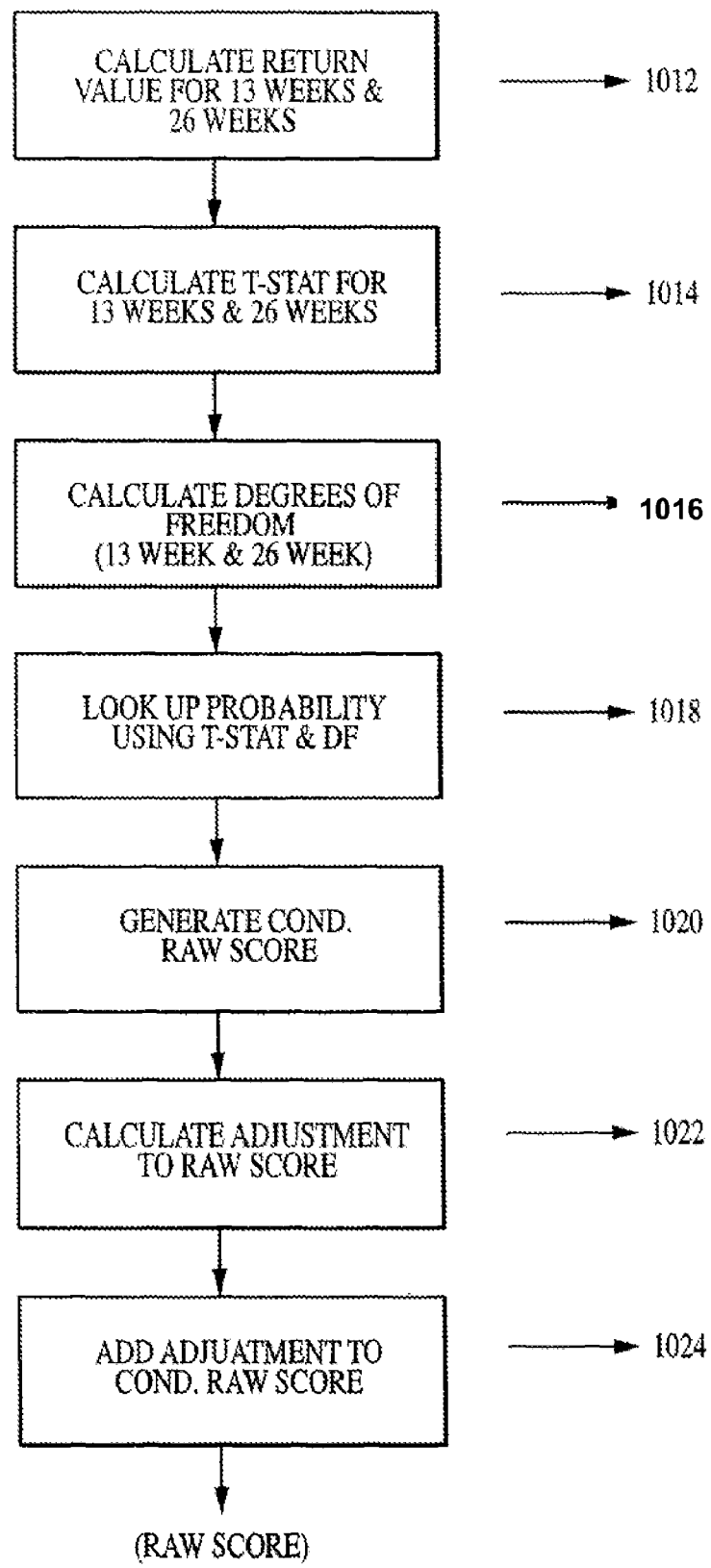
FIG. 10 is a flow diagram illustrating a lower level process for generating a buy performance measure utilizable in the processes of FIGS. 7-8.

As one example, the calculation of one performance measure or raw buy score is now described with reference to FIG. 10. In this example, the rate of return on the investor's investment is utilized in the generation of the performance score. More specifically, one or more return values for one or more return intervals are, initially, calculated or gathered for each investor 1012 by any suitable means. In this particular embodiment, two return values, one at 3 months (i.e., 13 weeks) and a second at 6 months (i.e., 26 weeks), are utilized for exemplary purposes. In actual practice however any number of return values, at any number of time intervals, are allowable so long as they are suitable proxies for short and long-term performance.

Subsequently, a statistical measure of confidence in the investor's performance may be calculated for each return value 1014. As one example, a t-statistic or t-stat, taken in absolute terms, is utilized as this measure of confidence. The t-stat is a measure on a random sample (or pair of samples) in which a mean (or pair of means) appears in the numerator and an estimate of the numerator's standard deviation appears in the denominator. The latter estimate is based on the calculated sample variance estimates of the samples. Alternatively, other standard variance methods or some other similar index of variability may optionally be used in place of standard deviation. Significantly, if these calculations yield a value of (t) that is sufficiently different from zero, the test is considered to be statistically significant.

In this embodiment, the t-stats for each return period may be determined by:

$$\text{buy } t \text{ stat} = \left| \frac{\text{buy return}}{\left( \frac{\text{buy\_standard\_deviation}}{\sqrt{\text{total\_number\_of\_buy\_decisions}}} \right)} \right|$$

Furthermore, to prevent division by zero, if the standard deviations for either of the time intervals is zero, then the raw buy score for that investor is set to zero. In addition, although the t-stat is used in this example, other measures of confidence may just as easily be incorporated in the present invention. As another example, the z-statistic or other similar measurement may also be used. Furthermore, regardless of what method is used to produce the measure of confidence, the measure of confidence may also be manipulated or weighted to consider other factors, so long as it accurately reflects, for instance, the investor's return history and historical consistency at picking entry and exit points in the investment.

After calculating the measures of confidence, in this embodiment the t-stats for each time interval or return period, one or more degrees of freedom are determined by subtracting, for example, one from the number of observations or decisions for each return value 1016. The degree of freedom is used to describe the number of values in a final calculation of a statistic that are free to vary. The observations or decisions, on the other hand, is a consistent pattern of behavior by a given investor over a period of time. Hence, the degree of freedom is determined by:

buy degree of freedom=total number of buy decisions−1

Next, a probability indicating, for example, the likelihood that an insider's and/or investing entity's actions will actual produce the expected result, is determined for the measure of performance 1018. In this embodiment, the degree of freedom values, along with the absolute t-stat values, are used in determining a probability for each return period 1018. Specifically, subject to the following optional conditions, the probabilities are looked-up in a common statistics lookup table using each return interval's degree of freedom and t-stat. If any of the degrees of freedom are greater than 100, then that degree of freedom is set to 100 before looking up the probability. If any of the absolute t-stats are greater than 20, then that absolute t-stat is set to 20 before looking up the probability. Finally, if either t-stat is less than 0.01, then the corresponding probability is simply set to 0. In addition, the probabilities may be calculated utilizing other methods. For instance, the t-stat and the degree of freedom may undergo further manipulation before looking up the probability. Alternatively, other analogous methods may be utilized in place of the look-up table to determine the probabilities.

Subsequent to determining the probabilities for each return period, a conditional raw score is generated 1020. The conditional raw score represents an initial investor performance measure and may undergo one of any number of manipulations to result in various other performance measures. For instance, the conditional raw score may be weighted to place additional emphasis on the maturity of the corporation. Alternatively, investments in conservative sectors may also receive a corresponding modification to reflect the same. These modifications are introduced for exemplary reasons only and it is to be understood that other manipulations are also possible within the scope of the present invention.

In this embodiment, the conditional raw score is determined by:

$$\text{cond\_raw\_score\_buy} = \left\{ \frac{[1-(.5+\text{or}-13\text{week\_prob\_buy})]+ [1-(.5+\text{or}-26\text{week\_prob\_buy})]}{2} \right\} * 100$$

Whether the probabilities are added or subtracted is determined by the following conditions. If either probability is greater than zero, then that probability is subtracted from 0.5. Otherwise, 0.5 is added to the probability.

Then, any number of optional adjustments to the conditional raw score are determined 1022. In one example, an adjustment reflects and emphasizes the number of transactions made by the investing entity.

In this example, the adjustment is determined by:

$$\text{adjustment} = (-20) * \left| \frac{1}{\sqrt{\frac{\text{num\_3mo\_dec\_buys} + \text{num\_6mo\_dec\_buys}}{2}}} \right|$$

As will be noted from the above formula, two separate decision amounts are considered in this embodiment. However, as discussed above, any other modifications are also possible. For instance, modifications may be made placing a much greater emphasis on short term investments to produce an adjustment aimed at producing scores for use in formulating short term investment strategies. Or, in contrast, greater weight may be placed on returns over longer periods of time to reflect, for example, a more conservative investment strategy.

From there, the raw buy score is calculated by adding any adjustments to the conditional raw score 1024. Once again, even though only one adjustment is made to the conditional score in this example, it is to be understood that any number of adjustments or modifications may be made within the scope of the invention.

Figure 11:
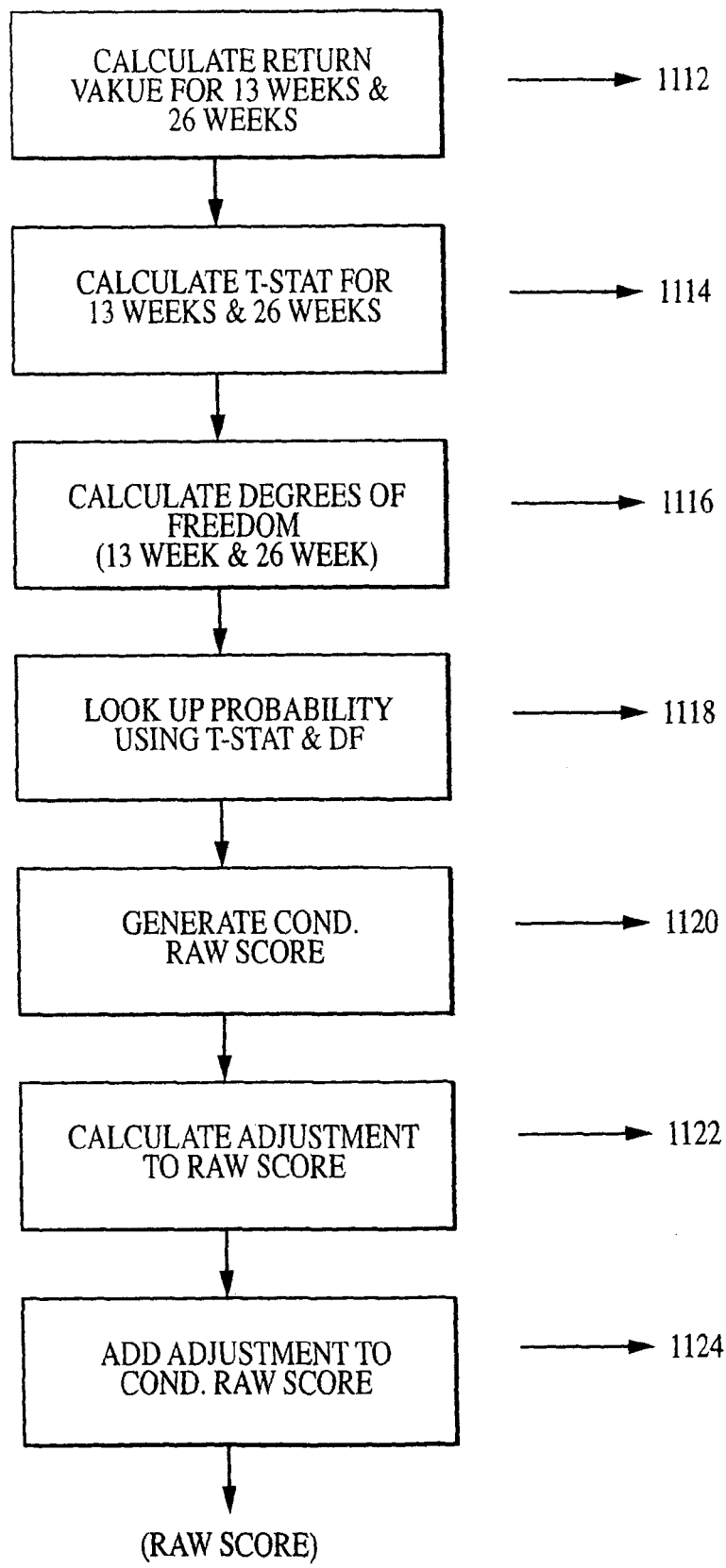
FIG. 11 is a flow diagram illustrating a lower level process for generating a sell performance measure utilizable in the processes of FIGS. 7 and 9.

Generation of a raw sell score is similar to generation of a raw buy score and is depicted in FIG. 11. Like the raw buy score, the raw sell score is indicative of an investor's sell performance, and may be manipulated in any number of ways to produce other investor performance scores. Similar to the generation of the raw buy scores, one or more return values are initially calculated or gathered for each investor 1112 by any suitable means. Again, two return values, one at 3 months (i.e., 13 weeks) and a second at 6 months (i.e., 26 weeks), are utilized for exemplary purposes.

Subsequently, a statistical, measure of confidence in the investor's performance is calculated 1114. In this case, a t-statistic (t-stat), in absolute terms, is again utilized for exemplary reasons, and is likewise calculated for each return value 1114.

For sell transactions, the t-stats for each return period is determined by:

$$\text{sell } t \text{ stat} = \left| \frac{\text{sell return}}{\left( \frac{\text{sell\_standard\_deviation}}{\sqrt{\text{total\_number\_of\_buy\_decisions}}} \right)} \right|$$

Like with the buy performance score, to prevent division by zero, if the standard deviations for either of the time intervals is zero, then the raw sell score for that investor is set to zero.

Again, as with the above example, it is to be understood that other measure of confidence may be substituted for the t-stat. Also, any number of modifications are also possible. As indicated above, as long as an accurate reflection of the investor's return history and/or historical consistency at picking entry and exit points is considered, any measure of confidence, for example a z-stat, may be used.

After calculating the measures of confidence, in this case t-stats, for each time 20 interval or return period, one or more degrees of freedom are determined by subtracting, for example, one from the number of observations or decisions for each return value 1116. Accordingly, the degree of freedom is determined by:

sell degree of freedom=total number of sell decisions−1

Subsequently, a probability is determined for the measure of performance 1118. In this example, the degree of freedom values, along with the absolute t-stat values, are used in determining a probability for each return period 1118. Specifically, subject to the following optional conditions, the probabilities are looked-up in a common statistics lookup table using each return interval's degree of freedom and t-stat. If any of the degrees of freedom are greater than 100, then that degree of freedom is set to 100 before looking up the probability. If any of the absolute t-stats are greater than 20, then that absolute t-stat is set td 20 before looking up the probability. Finally, if either t-stat is less than 0.01, then the corresponding probability is simply set to 0. Alternatively, the probabilities may be calculated based on other methods. For example, the measures of confidence and degrees of freedom may be modified or manipulated before looking up the probability in the lookup table. Also, any other similar methods may be used in place of the look-up table to generate a probability.

Subsequent to determining the probabilities for each return period, a conditional raw score is generated 1120. This conditional raw score provides an initial investor performance measure and may be modified to produce various other performance measures. Although the below example depicts only one modification, namely to emphasis the number of transactions made by the investor, any number of other modifications are possible.

In this example, the conditional raw score is determined by:

$$\text{cond\_raw\_score\_sell} = \left\{ \frac{[1 - (.5 + \text{or} - 13\,\text{week\_prob\_sell})] + [1 - (.5 + \text{or} - 26\,\text{week\_prob\_sell})]}{2} \right\} * 100$$

Whether the sell probabilities are added or subtracted is determined by the following condition. In contrast to the buy logic which tests for probabilities that are greater than zero, if either sell probability is less than zero, then that probability is subtracted from 0.5. Otherwise, 0.5 is added to the probability.

Then, any optional adjustments to the conditional raw score are determined 1122. In this example, an adjustment is made to reflect and emphasize the number of transactions made by the investor. In this embodiment, the adjustment is determined by:

$$\text{adjustment} = (-20) * \left| \frac{1}{\sqrt{\frac{\text{num\_3mo\_dec\_sells} + \text{num\_6mo\_dec\_sells}}{2}}} \right|$$

From there, the raw sell score is calculated by adding any adjustments to the conditional raw score 1124.

Figure 12:
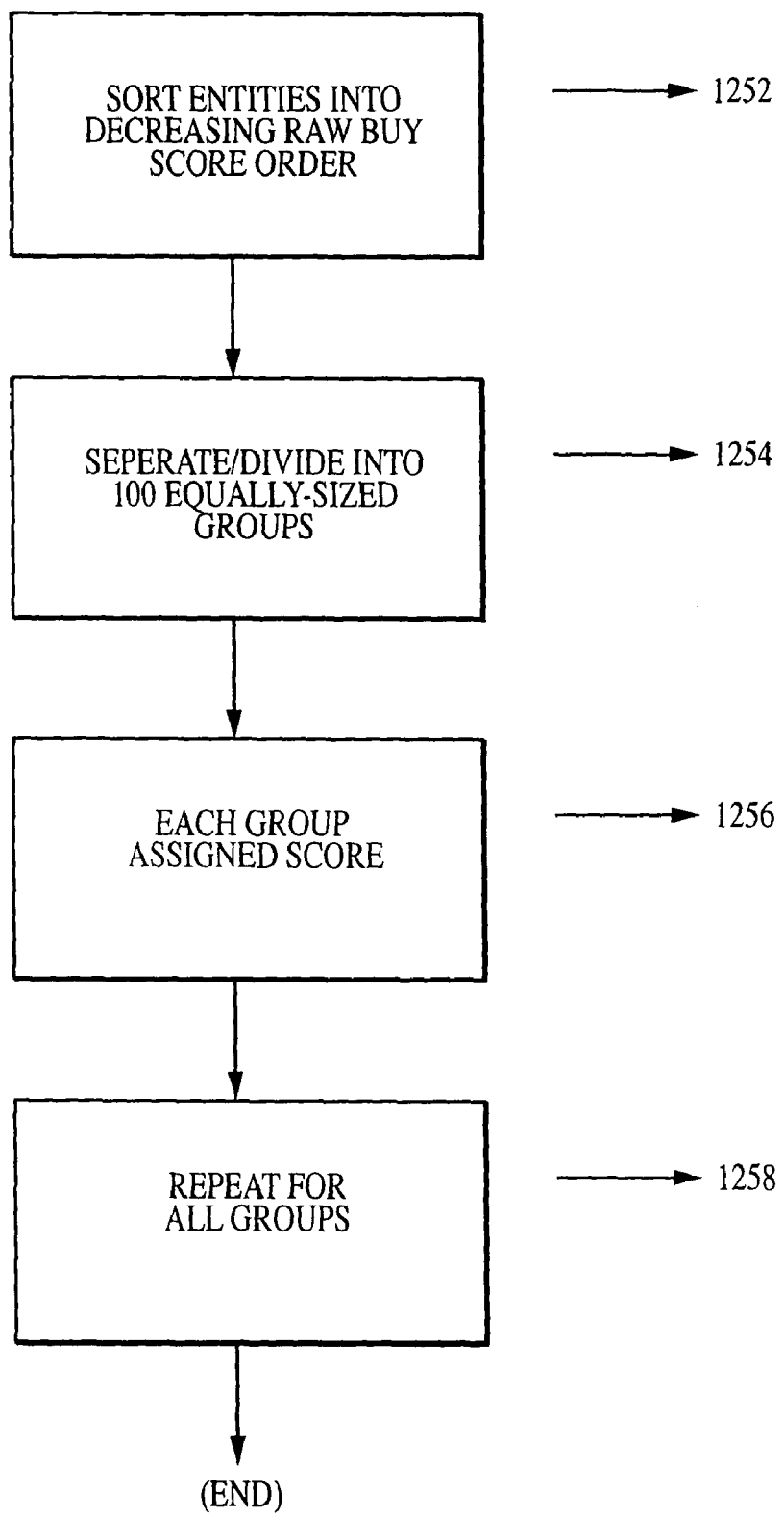
FIG. 12 is a flow diagram illustrating a process for ranking investors according to buy performance utilizable in the process of FIG. 7.

In accordance with the principles of the present invention, one example of proven buy score generation is depicted with reference to FIG. 12. In particular, buy score generation commences with sorting of the investors into descending (or ascending) raw buy score order 1252. Then, if there are one-hundred or more investors, the investors are divided or separated into 100 substantially equally sized groups 1254, according to the descending (or ascending) order. If there are less than one-hundred investors, each investor constitutes an entire group. Each group is subsequently assigned a rank 1256, with the highest ranking group receiving the highest rank and with the next highest ranking group receiving the next highest rank. This procedure is repeated until each group has been ranked 1258. If there are less than one-hundred groups, the highest ranking investor receives the highest rank, with the next highest performing investor being assigned a rank reduced from the highest rank by an amount equal to one-hundred divided by the number of investors. Again, this procedure is repeated until all of the investors have been ranked.

Figure 13:
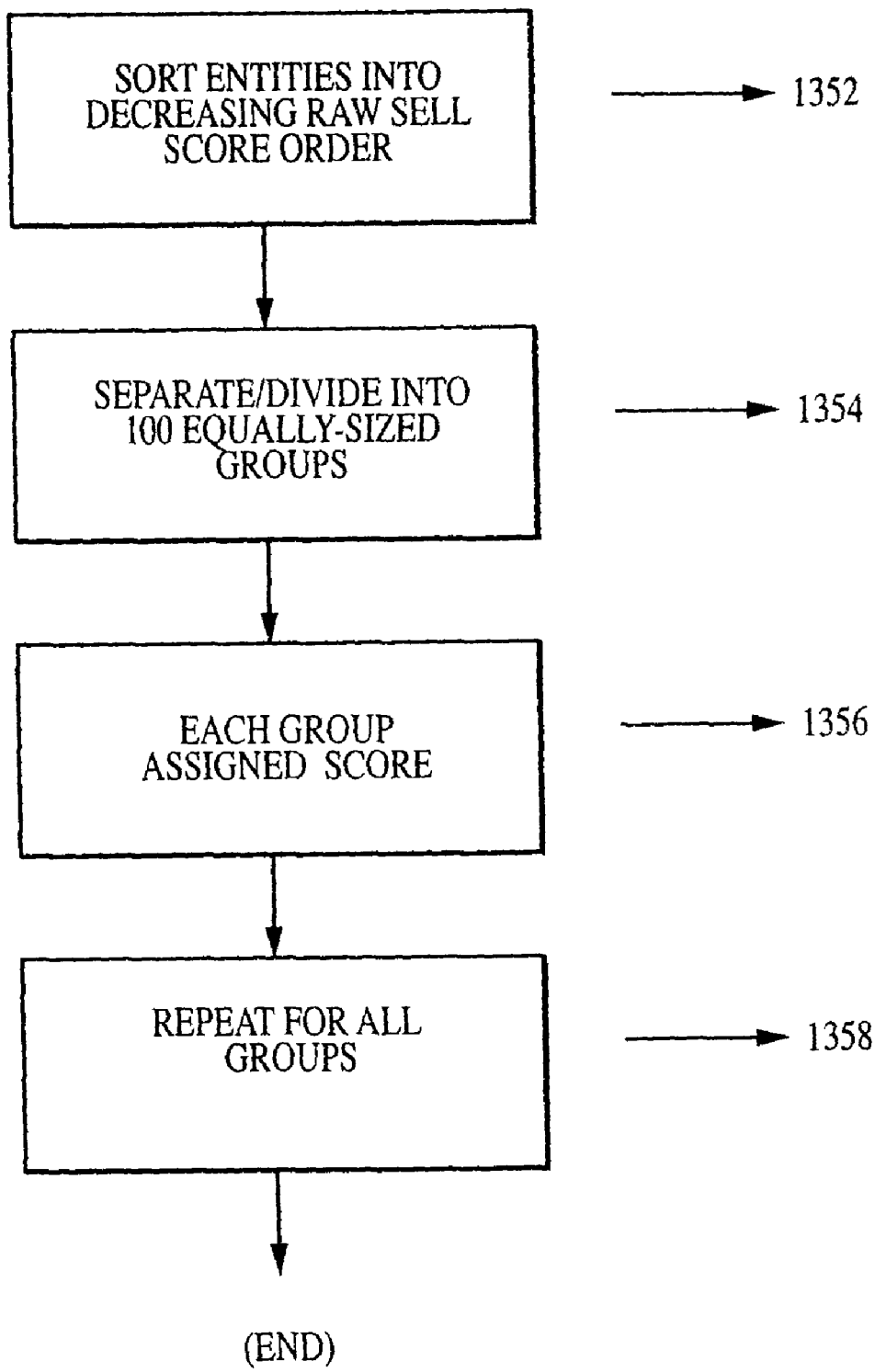
FIG. 13 is a flow diagram illustrating a process for ranking investors according to sell performance utilizable in the process of FIG. 7.

A similar procedure is utilized to rank the investors with respect to proven sell scores, as depicted in FIG. 13. Thus this process is only briefly summarized here. Specifically, the investors are sorted into descending (or ascending) proven sell score order 1352, separated into equally sized groups 1354, and then assigned a rank 1356 and 1358 in a similar manner as discussed above.

Figure 14:
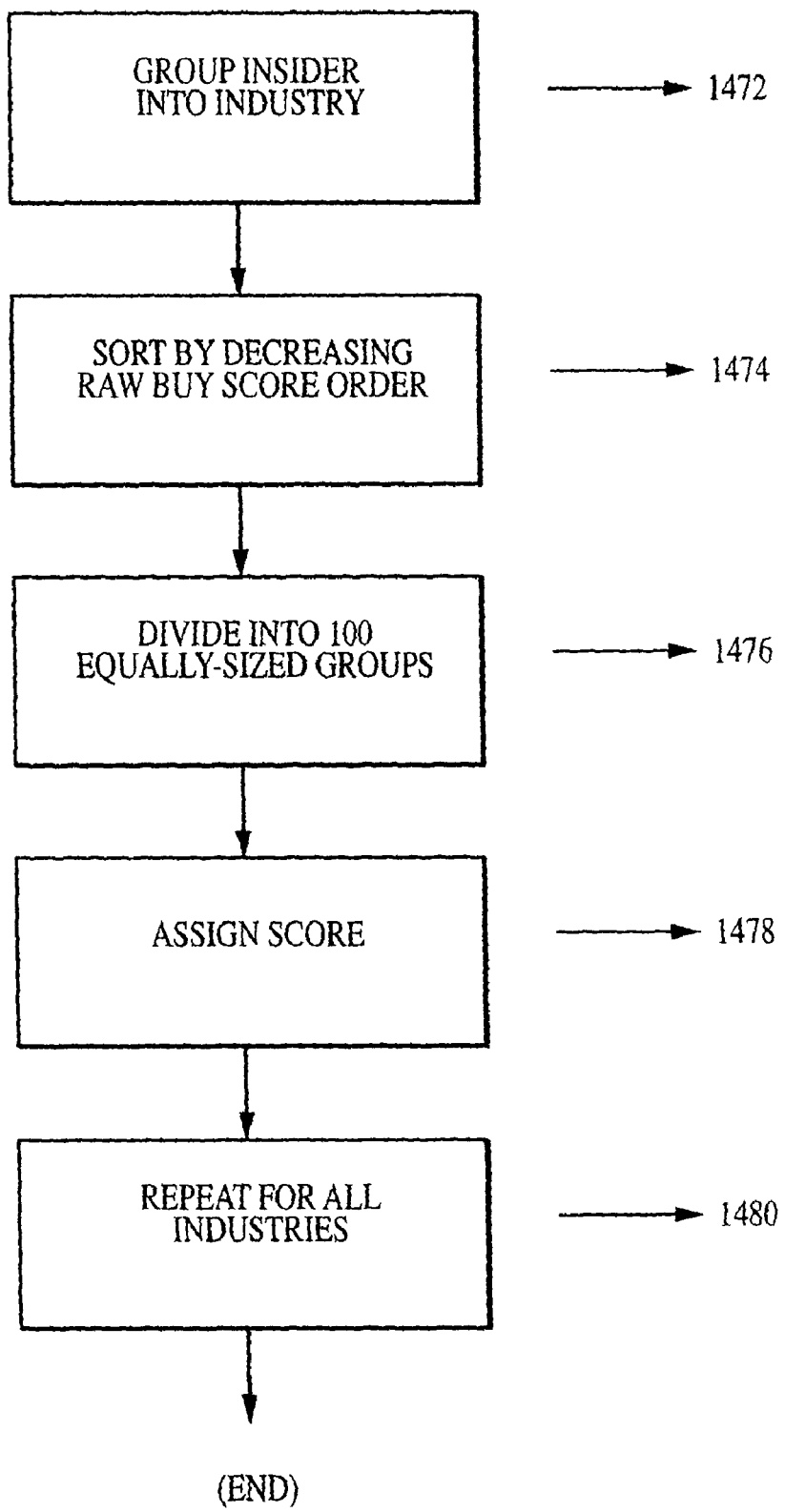
FIG. 14 is a flow diagram illustrating a process for ranking investors in a particular industry sector according to buy performance utilizable in the process of FIG. 7.

In accordance with the principles of the present invention, one example of proven buy industry score generation is depicted with reference to FIG. 14. In particular, buy industry score generation commences with the grouping of investors into industry sectors 1472. After grouping into industries, processing continues with sorting of the investors in the industry sector into descending (or ascending) raw buy score order 1474. Then, if there are one-hundred or more investors in the particular industry, the investors are divided or separated into 100 substantially equally sized groups 1476, according to the descending (or ascending) order. If there are less than one-hundred investors in the industry, each investor constitutes an entire group. Each group is subsequently assigned a rank 1478, with the highest ranking group in the industry receiving the highest rank and with the next highest ranking group receiving the next highest rank. This procedure is repeated until each group in the industry has been ranked. If there are less than one hundred groups, the highest ranking investor receives the highest rank, with the next highest performing investor receiving a rank reduced from the highest rank by an amount equal to one-hundred divided by the number of investors in the industry at issue. Again, this procedure is repeated until all of the investors in the industry sector have been ranked. Optionally, this procedure may be repeated until any or all additional industries have been ranked 1480.

Figure 15:
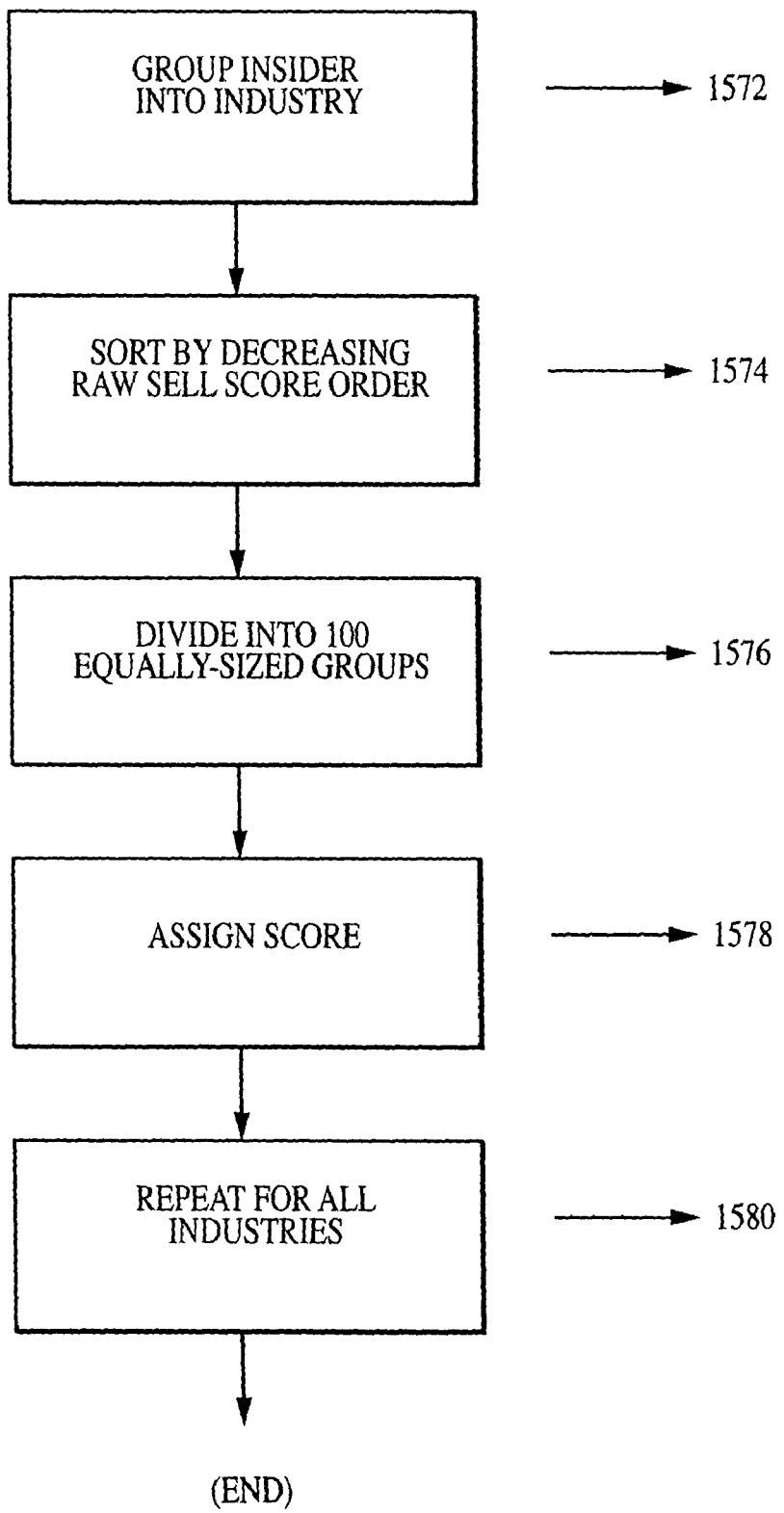
FIG. 15 is a flow diagram illustrating a process for ranking investors in a particular industry sector according to sell performance utilizable in the process of FIG. 7.

A similar procedure is utilized to rank the investors with respect to proven sell industry scores, as depicted in FIG. 15. Thus, this procedure is only briefly summarized here. Specifically, the investors are grouped into industry sectors 1572, sorted into descending (or ascending) proven sell industry score order 1574, separated into equally sized groups 1576, and then assigned a rank 1578. This procedure may optionally be repeated for each industry 1580, in a similar manner as discussed above.

In addition, as mentioned above, any other similar and analogous groups/rankings or performance measures may be generated. For instance, instead of grouping investors into industries, the present invention is to be construed as allowing the grouping and the subsequent generation of performance score based on, for example, the size or value of a non-person investment entity. Thus, using this example, the present invention may be used to rank corporations having a predetermined value. Similarly, as another example, a user may only wish to rank or evaluate the performance of nonprofit organizations investing only in currencies. Or perhaps the user may wish to evaluate only organizations headquartered in Midwestern United States, perhaps to be supplied by the user. In any of these cases, the present invention would allow any such or similar designation by the user before processing.

One example depicting the tabulated results of processing in accordance with the above techniques is shown in FIG. 21.

Figure 16:
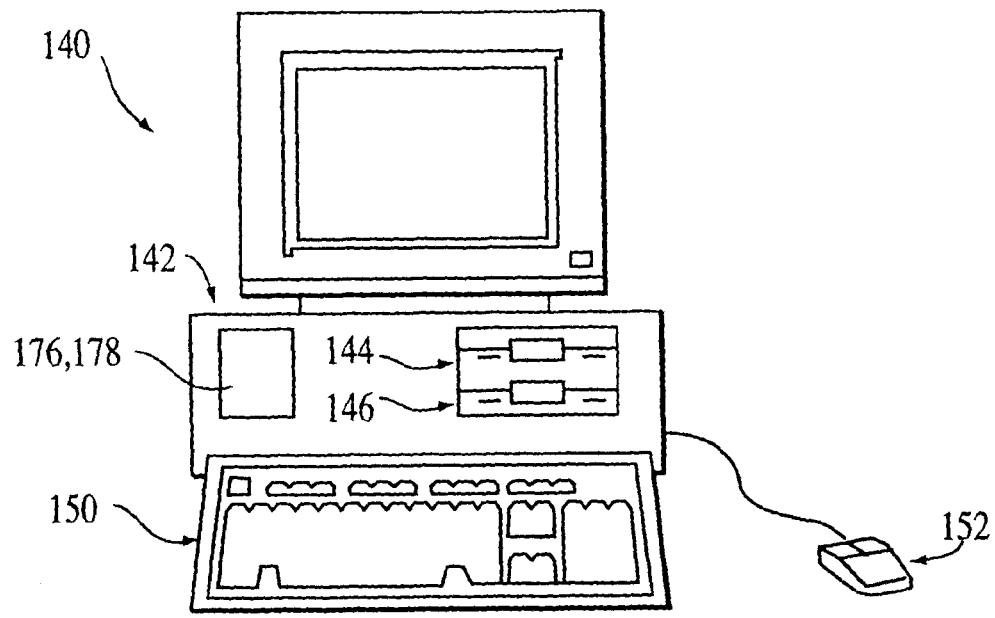
FIG. 16 illustrates one example of a central processing unit for implementing a computer process in accordance with a computer implemented embodiment of the present invention.

Viewed externally in FIG. 16, a computer system designated by reference numeral 140 has a computer 142 having disk drives 144 and 146. Disk drive indications 144 and 146 are merely symbolic of a number of disk drives which might be accommodated by the computer system. Typically, these would include a floppy disk drive 144, a hard disk drive (not shown externally) and a CD ROM indicated by slot 146. The number and type of drives vary, typically with different computer configurations. Disk drives 144 and 146 are in fact optional, and for space considerations, are easily omitted from the computer system used in conjunction with the production process/apparatus described herein.

The computer system also has an optional display upon which information, such as the screens illustrated in FIGS. 5-6 may be displayed. In some situations, a keyboard 150 and a mouse 152 are provided as input devices through which a user's actions may be inputted, thus allowing input to interface with the central processing unit 142. Then again, for enhanced portability, the keyboard 150 is either a limited function keyboard or omitted in its entirety. In addition, mouse 152 optionally is a touch pad control device, or a track ball device, or even omitted in its entirety as well, and similarly may be used to input a user's selections. In addition, the computer system also optionally includes at least one infrared transmitter and/or infrared received for either transmitting and/or receiving infrared signals, as described below.

Figure 17:
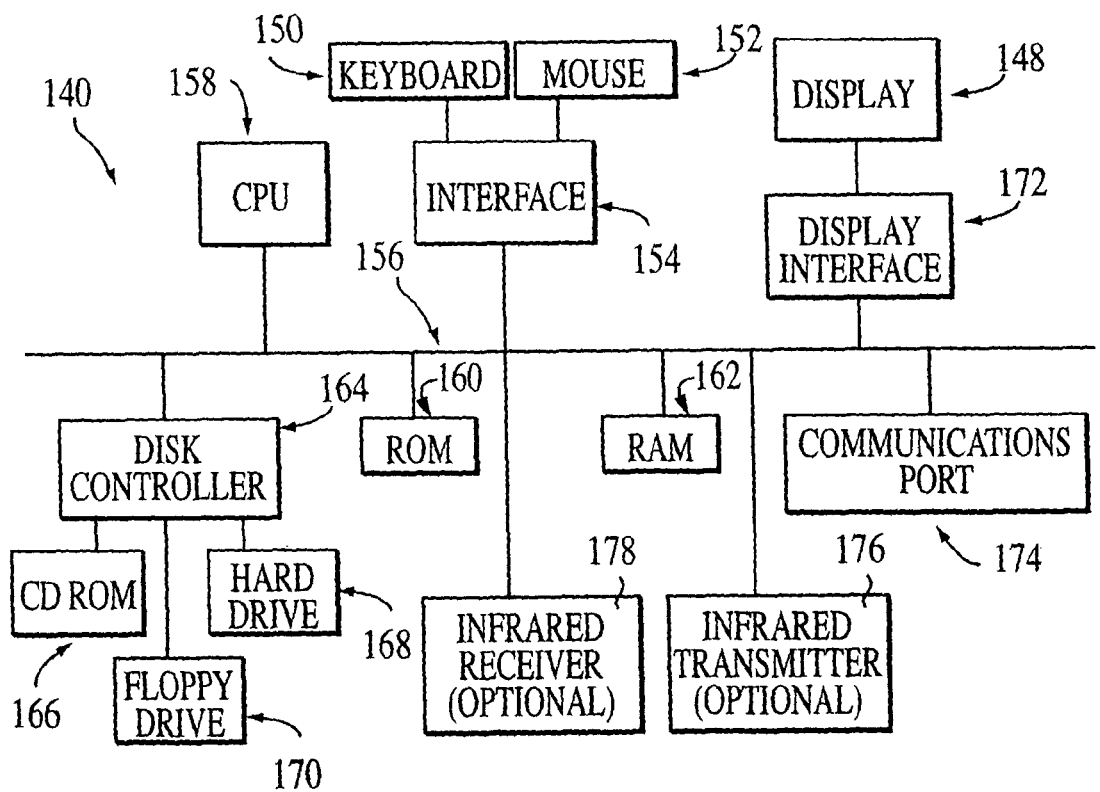
FIG. 17 illustrates one example of a block diagram of internal hardware of the central processing unit of FIG. 16.

FIG. 17 illustrates a block diagram of the internal hardware of the computer system 140 of FIG. 16. A bus 156 serves as the main information highway interconnecting the other components of the computer system 140. CPU 158 is the central processing unit of the system, performing calculations and logic operations required to execute the processes of the instant invention as well as other programs. Read only memory (ROM) 160 and random access memory (RAM) 162 constitute the main memory of the computer. Disk controller 164 interfaces one or more disk drives to the system bus 156. These disk drives are, for example, floppy disk drives such as 170, or CD ROM or DVD (digital video disks) drive such as 166, or internal or external hard drives 168. As indicated previously, these various disk drives and disk controllers are optional devices.

A display interface 172 interfaces display 148 and permits information from the bus 156 to be displayed on the display 148. Again as indicated, display 148 is also an optional accessory. For example, display 148 could be substituted or omitted. Communications with external devices, for example, the other components of the system described herein, occur utilizing communication port 174. For example, optical fibers and/or electrical cables and/or conductors and/or optical communication (e.g., infrared, and the like) and/or wireless communication (e.g., radio frequency (RF), and the like) can be used as the transport medium between the external devices and communication port 174. Peripheral interface 154 interfaces the keyboard 150 and the mouse 152, permitting input data to be transmitted to the bus 156. In addition to the standard components of the computer, the computer also optionally includes an infrared transmitter 178 and/or infrared receiver 176. Infrared transmitters are optionally utilized when the computer system is used in conjunction with one or more of the processing components/stations that transmits/ receives data via infrared signal transmission. Instead of utilizing an infrared transmitter or infrared receiver, the computer system may also optionally use a low power radio transmitter 180 and/or a low power radio receiver 182 as shown in the alternate embodiment of FIG. 18. The low power radio transmitter transmits the signal for reception by components of the production process, and receives signals from the components via the low power radio receiver. The low power radio transmitter and/or receiver are standard devices in industry.

Figure 18:
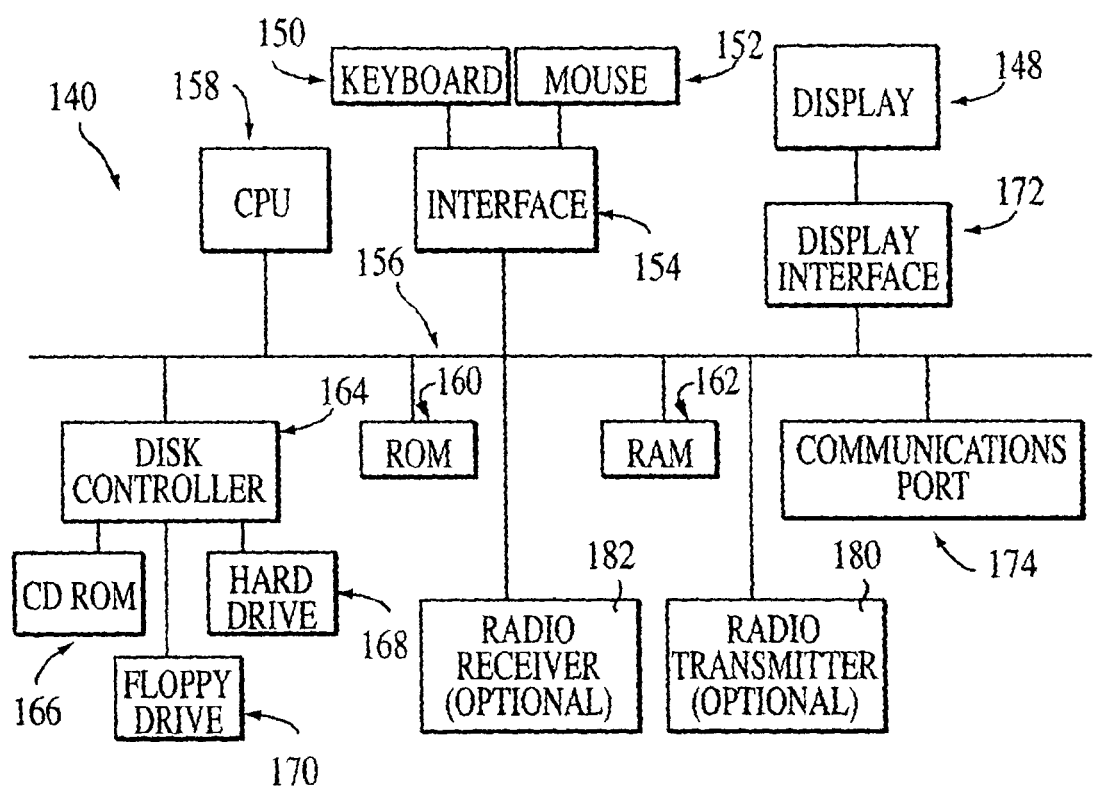
FIG. 18 illustrates another example of a block diagram of internal hardware of the central processing unit of FIG. 16.
Figure 19:
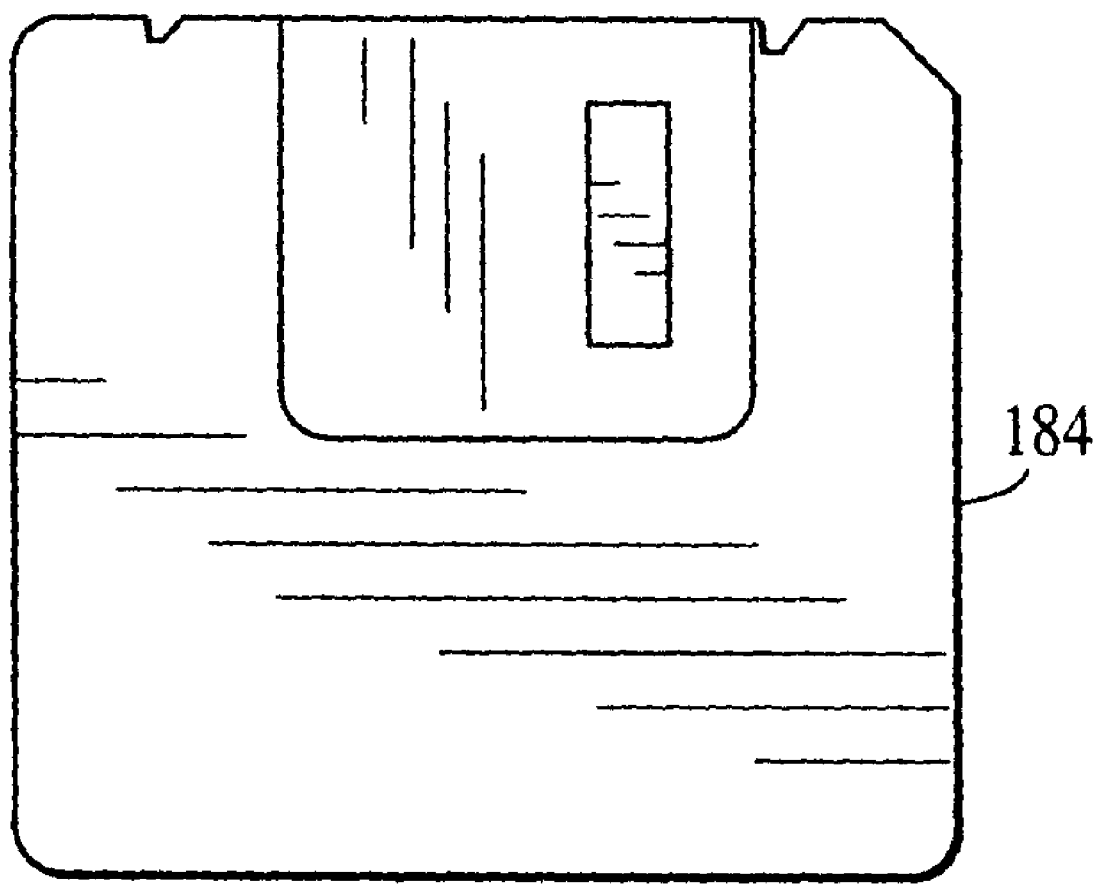
FIG. 19 illustrates one example of a memory medium which may be used for storing a computer implemented process of the present invention.

FIG. 19 is an illustration of an exemplary memory medium 184 which can be used with disk drives illustrated in FIGS. 16-18. Typically, memory media such as floppy disks, or a CD ROM, or a digital video disk will contain, for example, a multi-byte locale for a single byte language and the program information for controlling the computer to enable the computer to perform the functions described herein. Alternatively, ROM 160 and/or RAM 162 illustrated in FIGS. 17 and 18 can also be used to store the program information that is used to instruct the central processing unit 158 to perform the operations associated with the instant processes.

Although computer system 140 is illustrated having a single processor, a single hard disk drive and a single local memory, the system 140 is optionally suitably equipped with any multitude or combination of processors or storage devices. Computer system 140 is, in point of fact, able to be replaced by, or combined with, any suitable processing system operative in accordance with the principles of the present invention, including sophisticated calculators, and hand-held, laptop/notebook, mini, mainframe and super computers, as well as processing system network combinations of the same.

Conventional processing system architecture is more fully discussed in *Computer Organization and Architecture*, by William Stallings, MacMillan Publishing Co. (3rd ed. 1993); conventional processing system network design is more fully discussed in *Data Network Design*, by Darren L. Spohn, McGraw-Hill, Inc. (1993), and conventional data communications are more fully discussed in *Data Communications Principles*, by R. D. Gitlin, J. F. Hayes and S. B. Weinstain, Plenum Press (1992) and in *The Irwin Handbook of Telecommunications*, by James Harry Green, Irwin Professional Publishing (2nd ed. 1992). Each of the foregoing publications is incorporated herein by reference. Alternatively, the hardware configuration is, for example, arranged according to the multiple instruction multiple data (MIMD) multiprocessor format for additional computing efficiency. The details of this form of computer architecture are disclosed in greater detail in, for example, U.S. Pat. No. 5,163,131; Boxer, A., Where Buses Cannot Go, IEEE Spectrum, February 1995, pp. 41-45; and Barroso, L. A. et al., RPM: A Rapid Prototyping Engine for Multiprocessor Systems, IEEE Computer February 1995, pp. 26-34, all of which are incorporated herein by reference.

In alternate preferred embodiments, the above-identified processor, and, in particular, CPU 158, may be replaced by or combined with any other suitable processing circuits, including programmable logic devices, such as PALs (programmable array logic) and PLAs (programmable logic arrays). DSPs (digital signal processors), FPGAs (field programmable gate arrays), ASICs (application specific integrated circuits), VLSIs (very large scale integrated circuits) or the like.

Figure 20:
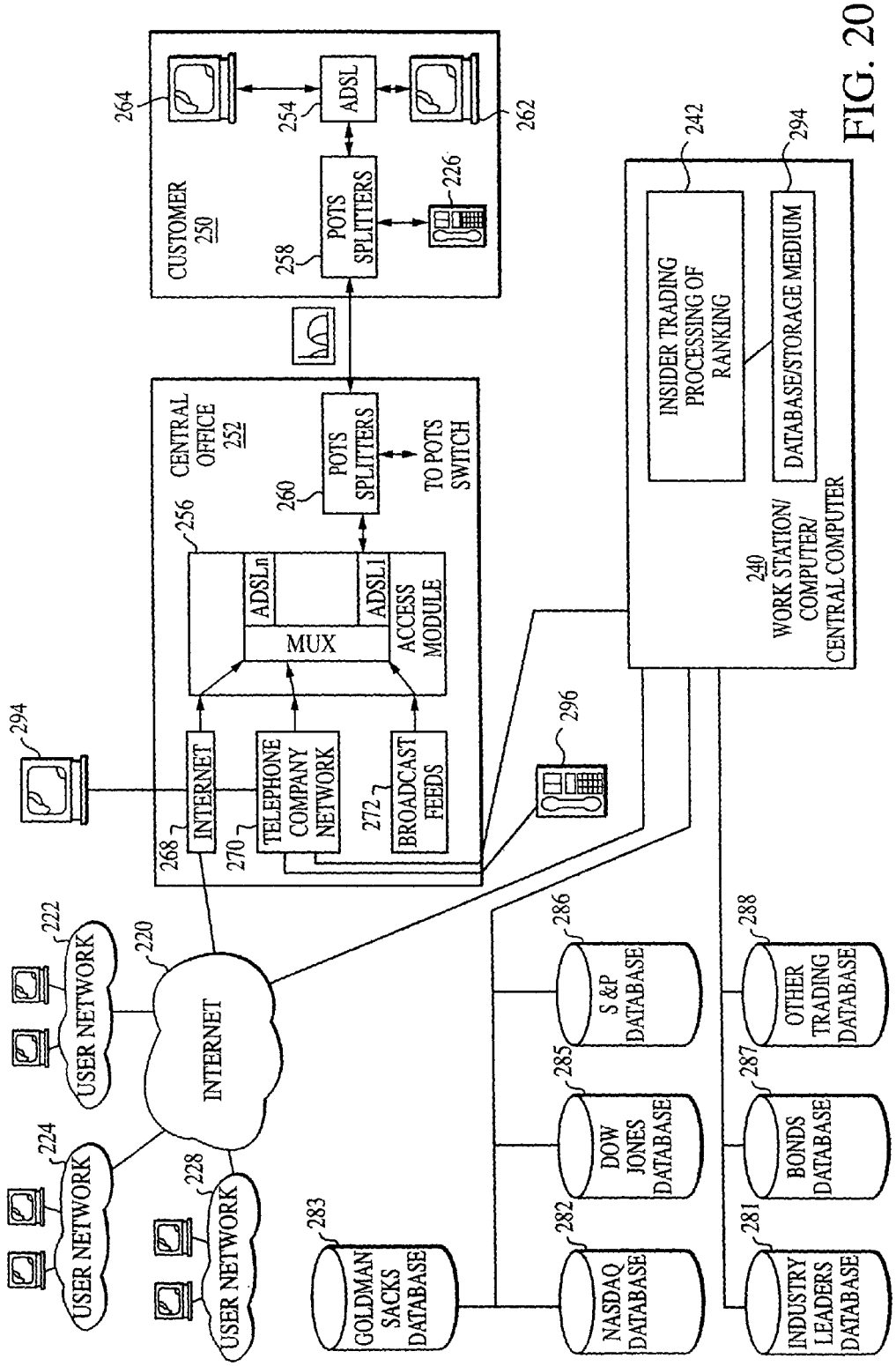
FIG. 20 illustrates an example of a combined Internet, POTS, and ADSL architecture which may be used with the present invention.

FIG. 20 is an illustration of the architecture of the combined Internet, POTS (plain, old, telephone service), and ADSL (asymmetric, digital, subscriber line) for use in accordance with the principles of the present invention. Furthermore, it is to be understood that the use of the Internet, ADSL, and POTS are for exemplary reasons only and that any suitable communications network may be substituted without departing from the principles of the present invention. This particular example is briefly discussed below.

In FIG. 20, to preserve POTS and to prevent a fault in the ADSL equipment 254, 256 from compromising analog voice traffic 226, 296 the voice part of the spectrum (the lowest 4 kHz) is separated from the rest by a passive filter, called a POTS splitter 258, 260. The rest of the available bandwidth—from about 10 kHz to 1 MHz—carries data at rates up to 6 bits per second for every hertz of bandwidth from data equipment 262, 264, and 294. The ADSL equipment 256 then has access to a number of destinations including significantly the Internet 220 or other data communications networks, and other destinations 270, 272.

To exploit the higher frequencies, ADSL makes use of advanced modulation techniques, of which the best known is the discrete multitone (DMT) technology. As its name implies, ADSL transmits data asymmetrically—at different rates upstream toward the central office 252 and downstream toward the subscriber 250.

Cable television providers are providing analogous Internet service to PC users over their TV cable systems by means of special cable modems. Such modems are capable of transmitting up to 30 Mb/s over hybrid fiber/coax system, which use fiber to bring signals to a neighborhood and coax to distribute it to individual subscribers.

Cable modems come in many forms. Most create a downstream data stream out of one of the 6-MHz TV channels that occupy spectrum above 50 MHz (and more likely 550 MHz) and carve an upstream channel out of the 5-50-MHz band, which is currently unused. Using 64-state quadrature amplitude modulation (64 QAM), a downstream channel can realistically transmit about 30 Mb/s (the oft-quoted lower speed of 10 Mb/s refers to PC rates associated with Ethernet connections). Upstream rates differ considerably from vendor to vendor, but good hybrid fiber/coax systems can deliver upstream speeds of a few megabits per second. Thus, like ADSL, cable modems transmit much more information downstream than upstream. Then Internet architecture 220 and ADSL architecture 254, 256 may also be combined with, for example, user networks 222, 224, and 228.

In accordance with the principles of the present invention, in one example, a main computing server implementing the process of the invention may be located on one computing node or terminal (e.g., on user network 222, or system 240). Then, various users may interface with the main server via, for instance, the ADSL equipment discussed above, and access the information and processes of the present invention from remotely located PCs. More specifically, a process 242 capable of performing the investor evaluating of the instant invention may advantageously implemented in system 240. As depicted in FIG. 20, process 242 may access a list of investors stored, for instance in data structure 294. Furthermore, although data structure 294 is shown as being stored in system 240, it may just as easily be located in a remote and distinct computer system. For example, process 242 may be implemented in such a manner as to have access to one of any number of databases 281, 282, 283, 285, 286, 287 or 288.

Furthermore, the investor evaluating process of the present invention may also be implemented manually. For instance, it is possible to evaluate investors by hand without the assistance of computing systems.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A computer implemented method executed on a processor in communication with a memory and an output device of evaluating an investor's performance against performances of other investors by utilizing information stored in said memory pertaining to at least one first transaction made by the investor involving at least one investment and to at least one second transaction made by the investor involving at least another investment, said method comprising the steps of:

determining by the processor a first average return value for the at least one first transaction, said first average return value corresponding to an average rate of return of the at least one first transaction involving the investment for a first period of time;

determining by the processor a second average return value for the at least one second transaction, said second average return value corresponding to an average rate of return of the at least one second transaction involving the investment for a second period of time;

calculating by the processor a first standard measure of confidence, for said first average return value and a second standard measure of confidence for said second average return value;

calculating by the processor a first degree of freedom for said first average return value and a second degree of freedom for said second average return value;

determining by the processor a first probability for said first period of time by utilizing said first standard measure of confidence and said first degree of freedom, and a second probability for said second period of time by utilizing said second standard measure of confidence and said second degree of freedom;

generating by the processor a conditional raw score for the investor by utilizing said first and second probabilities;

generating by the processor an adjusted raw score by utilizing the conditional raw score, said total number of transactions occurring during the first period of time, and said total number of transactions occurring during the second period of time;

determining by the processor a performance score indicative of the investor's performance relative to other investors based on the adjusted raw score comparing by the processor the performance score of the investor against performance scores of the other investors to produce an evaluation of the inventor; and electronically transmitting by the processor the evaluation of the investor to the output device.

2. The method of claim 1, wherein said first period of time is approximately three months and said second period of time is approximately six months.

3. The method of claim 1, wherein said information comprises confidential data.

4. The method of claim 1, wherein the performance score increases with a number of beneficial transactions.

5. The method of claim 1, wherein the performance score increases when the average rate of return of the at least one first transaction increases and the at least one first transaction is a buy transaction, or when the average rate of return of the at least one first transaction decreases and the at least one first transaction is a sell transaction.

6. The method of claim 1, wherein the performance score decreases when the average rate of return of the at least one first transaction decreases and the at least one first transaction is a buy transaction, or when the average rate of return of the at least one first transaction increases and the at least one first transaction is a sell transaction.

7. The method of claim 1, wherein the first standard measure of confidence and the second standard measure of confidence are respectively first and second t-stat values and the calculating of said first t-stat value (t-stat1) and said second t-stat value (t-stat2) is based at least in part on said first average return value (average.return1) and said second average return value (average.return2), a first standard deviation (SD1) and a second standard deviation (SD2), a total number of transactions (decisions1) occurring during the first period of time, and a total number of transactions (decisions2) occurring during the second period of time; and the generating by the processor of the adjusted raw score comprises adding an adjustment (adjustment) to the conditional raw score (cond. raw score), wherein the adjustment is based on said total number of transactions occurring during the first period of time and said total number of transactions occurring during the second period of time.

8. The method of claim 7, wherein if SD 1=0, then the adjusted raw score=0 otherwise wherein if SD2, =0, then the adjusted raw score=0 otherwise;

$$tstat_1 = \left| \frac{ave.\text{return1}}{\left(\frac{SD1}{\sqrt{decisions1}}\right)} \right|$$

; wherein if $SD_2$, = 0, then raw score = 0 otherwise $$tstat_2 = \left| \frac{ave.\text{return2}}{\left(\frac{SD2}{\sqrt{decisions2}}\right)} \right|$$

wherein the first degree of freedom (DF 1)=decisions, −1; and wherein the second degree of freedom (DF2)=decisions2−1.

9. The method of claim 7, wherein said first probability (prob1) and said second probability (prob2) are determined according to a predetermined look-up table using actual calculated values of: the first degree of freedom (DF1), the second degree of freedom (DF2), t-stat1, and t-stat2, unless: DF1>100, in which case DF1 is set to 100; DF2>100, in which case DF2 is set to 100; t-stat1>20, in which case t-stat1 is set to 20; t-stat2>20, in which case t-stat2 is set to 20; t-stat1<0.01, in which case prob1 is set to 0; or t-stat2<0.01, in which case prob2 is set to 0.

10. The method of claim 7, wherein the conditional raw score equals $$\left\{ \frac{[1 - (.5 + or - prob1)] + [1 - (.5 + or - prob2)]}{2} \right\} * 100$$

11. The method of claim 7, wherein $$adjustment = (-20) * \left| \frac{1}{\sqrt{\frac{decisions1 + decisions2}{2}}} \right|.$$

12. The method of claim 1, wherein the at least one first transaction and at least one second transaction comprise buy transactions, said method thereby providing an evaluation of the investor's buy performance.

13. The method of claim 1, wherein the at least one first transaction and at least one second transaction comprise sell transactions, said method thereby providing an evaluation of the investor's sell performance.

14. The method of claim 1, further comprising posting said evaluation of the investor on a computer system accessible via one or more data communications networks by other remotely located computer systems.

15. The method of claim 1, further comprising posting or providing access to investor and investment information on a computer system accessible via one or more data communications networks by other remotely located computer systems.

16. The method of claim 1, wherein said investor is at least one of a corporate insider, an individual, a joint venture, a corporation, a trust, a partnership, or other investment entity.

17. The method of claim 1, wherein the at least one investment is at least one of a security, bond, currency, commodity, paper, precious metal, mineral, mutual fund, natural resource.

18. The method of claim 1, wherein said investor is listed in a database containing substantially all entities filing insider documents with the Securities and Exchange Commission.

19. A system including a processor in communication with a memory and an output device for evaluating an investor's performance against performances of other investors by utilizing information stored in said memory pertaining to at least one first transaction made by the investor involving at least one investment and to at least one second transaction made by the investor involving at least another investment comprising:

means for determining by the processor a first average return value for the at least one first transaction, said first average return value corresponding to an average rate of return of the at least one first transaction involving the investment for a first period of time means for determining by the processor a second average return value for the at least one second transaction, said second average return value corresponding to an average rate of return of the at least one second transaction involving the investment for a second period of time;

means for calculating by the processor a first standard measure of confidence, for said first average return value and a second standard measure of confidence for said second average return value;

means for calculating by the processor a first degree of freedom for said first average return value and a second degree of freedom for said second average return value;

means for determining by the processor a first probability for said first period of time by utilizing said first standard measure of confidence and said first degree of freedom, and a second probability for said second period of time by utilizing said second standard measure of confidence and said second degree of freedom;

means for generating by the processor a conditional raw score for the investor by utilizing said first and second probabilities;

means for generating by the processor an adjusted raw score by utilizing the conditional raw score, said total number of transactions occurring during the first period of time, and said total number of transactions occurring during the second period of time;

means for determining by the processor a performance score indicative of the investor's performance relative to other investors based on the adjusted raw score means for comparing by the processor the performance score of the investor against performance scores of the other investors to produce an evaluation of the inventor; and means for electronically transmitting by the processor the evaluation of the investor to the output device.

* * * * *